(12) United States Patent
Okabayashi et al.

(10) Patent No.: US 10,590,881 B2
(45) Date of Patent: Mar. 17, 2020

(54) COMBUSTION SYSTEM ESTIMATION DEVICE AND CONTROL DEVICE

(71) Applicant: DENSO CORPORATION, Kariya, Aichi-pref. (JP)

(72) Inventors: Atsunori Okabayashi, Kariya (JP); Shinya Hoshi, Kariya (JP)

(73) Assignee: DENSO CORPORATION, Kariya (JP)

( * ) Notice: Subject to any disclaimer, the term of this patent is extended or adjusted under 35 U.S.C. 154(b) by 139 days.

(21) Appl. No.: 15/773,604

(22) PCT Filed: Sep. 13, 2016

(86) PCT No.: PCT/JP2016/076880
§ 371 (c)(1),
(2) Date: May 4, 2018

(87) PCT Pub. No.: WO2017/081932
PCT Pub. Date: May 18, 2017

(65) Prior Publication Data
US 2018/0320628 A1 Nov. 8, 2018

(30) Foreign Application Priority Data

Nov. 12, 2015 (JP) .................................. 2015-222316

(51) Int. Cl.
*F02D 35/02* (2006.01)
*F02D 41/40* (2006.01)
(Continued)

(52) U.S. Cl.
CPC ..... *F02D 41/3827* (2013.01); *F02D 19/0631* (2013.01); *F02D 19/0636* (2013.01);
(Continued)

(58) Field of Classification Search
CPC ............... F02D 19/0636; F02D 35/028; F02D 41/3827; F02D 41/405; F02D 2200/0611; F02D 2200/0612
See application file for complete search history.

(56) References Cited

U.S. PATENT DOCUMENTS

2008/0307772 A1* 12/2008 Kawamura ............. F01N 3/021
60/285
2011/0079194 A1 4/2011 Tanaka et al.
(Continued)

FOREIGN PATENT DOCUMENTS

| JP | 2004-044513 | 2/2004 |
|---|---|---|
| JP | 2010-096056 | 4/2010 |

(Continued)

OTHER PUBLICATIONS

U.S. Appl. No. 15/773,578 of Hoshi, et al., filed May 4, 2018, entitled Estimation Device and Control Device for Combustion System (72 pages).
(Continued)

*Primary Examiner* — Erick R Solis
(74) *Attorney, Agent, or Firm* — Nixon & Vanderhye P.C.

(57) ABSTRACT

An estimation device applicable to a combustion system having an internal combustion engine includes a mixing acquisition unit, a combustion amount estimation unit, a region estimation unit, and a timing estimation unit. The mixing acquisition unit acquires a mixing ratio of various components contained in fuel used for combustion in the internal combustion engine. The combustion amount estimation unit estimates a combustion amount of fuel caused by a post combustion generated by injecting fuel into a combustion chamber of the internal combustion engine by post injection, based on the mixing ratio acquired by the mixing acquisition unit. The region estimation unit estimates a combustion region of the post combustion in the combus-
(Continued)

tion chamber based on the mixing ratio. The timing estimation unit estimates an ignition timing at which ignition occurs in the combustion chamber by the post injection based on the mixing ratio.

9 Claims, 11 Drawing Sheets

(51) Int. Cl.
*F02D 41/38* (2006.01)
*F02D 19/06* (2006.01)
*F02D 41/00* (2006.01)
*F02D 41/04* (2006.01)
*F02D 45/00* (2006.01)
*F02D 41/14* (2006.01)

(52) U.S. Cl.
CPC .......... *F02D 35/02* (2013.01); *F02D 35/028* (2013.01); *F02D 41/0025* (2013.01); *F02D 41/047* (2013.01); *F02D 41/3872* (2013.01); *F02D 41/405* (2013.01); *F02D 45/00* (2013.01); *F02D 41/005* (2013.01); *F02D 2041/001* (2013.01); *F02D 2041/1433* (2013.01); *F02D 2200/0602* (2013.01); *F02D 2200/0612* (2013.01); *F02D 2200/0616* (2013.01); *F02D 2200/0802* (2013.01)

(56) References Cited

U.S. PATENT DOCUMENTS

| | | | |
|---|---|---|---|
| 2012/0145122 A1* | 6/2012 | Kurtz | ............... F02D 41/0025 123/299 |
| 2015/0252745 A1 | 9/2015 | Naruse et al. | |
| 2016/0363080 A1 | 12/2016 | Okabayashi | |
| 2016/0363084 A1 | 12/2016 | Hoshi et al. | |

FOREIGN PATENT DOCUMENTS

| | | |
|---|---|---|
| JP | 2012-255392 | 12/2012 |
| JP | 2013-245646 | 12/2013 |
| JP | 2015-169127 | 9/2015 |

OTHER PUBLICATIONS

U.S. Appl. No. 15/773,583 of Hoshi, et al., filed May 4, 2018, entitled Estimation Device and Control Device for Combustion System (52 pages.).

U.S. Appl. No. 15/773,584 of Hoshi, et al., filed May 4, 2018, entitled Estimation Device and Control Device for Combustion System (66 pages).

U.S. Appl. No. 15/773,590 of Hoshi, et al., filed May 4, 2018, entitled Estimation Device and Control Device for Combustion System (70 pages).

U.S. Appl. No. 15/773,625 of Hoshi, et al., filed May 4, 2018, Estimation Device and Control Device for Combustion System, (60 pages).

* cited by examiner

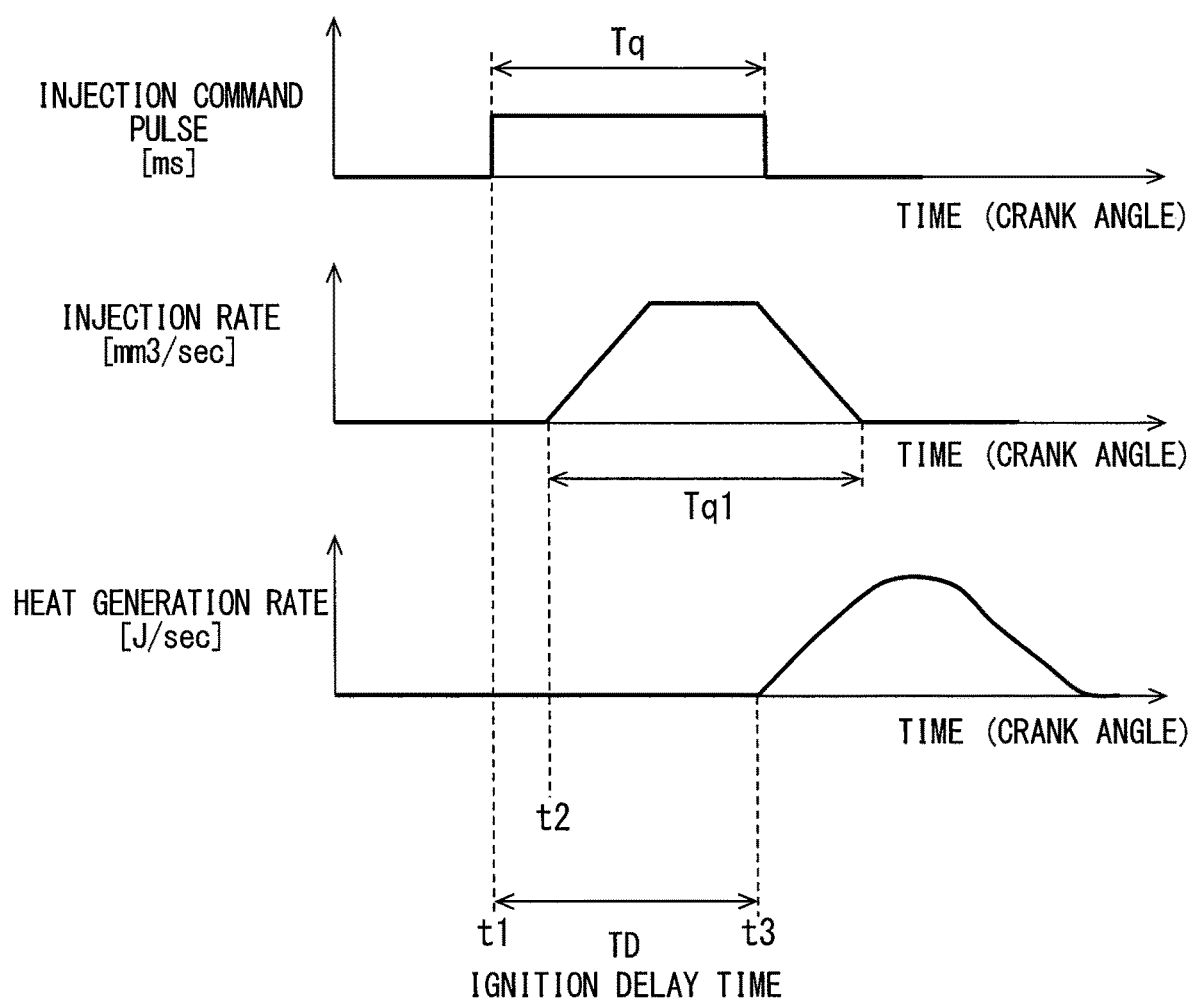

FIG. 3

$$\begin{Bmatrix} \text{MIXING AMOUNT OF LINEAR PARAFFINS} \\ \text{MIXING AMOUNT OF NAPHTHENES} \\ \text{MIXING AMOUNT OF SIDE CHAIN PARAFFINS} \\ \text{MIXING AMOUNT OF AROMATICS} \\ \vdots \end{Bmatrix} = \begin{Bmatrix} a_{00} & \cdots & a_{0Y} \\ \vdots & \ddots & \vdots \\ a_{X0} & \cdots & a_{XY} \end{Bmatrix} \cdot \begin{Bmatrix} \text{IGNITION DELAY TIM TD}(i) \\ \text{IGNITION DELAY TIM TD}(j) \\ \text{IGNITION DELAY TIM TD}(k) \\ \text{IGNITION DELAY TIM TD}(l) \\ \vdots \end{Bmatrix} \begin{matrix} : P(i), T(i), O_2(i), Pc(i) \\ : P(j), T(j), O_2(j), Pc(j) \\ : P(k), T(k), O_2(k), Pc(k) \\ : P(l), T(l), O_2(l), Pc(l) \end{matrix}$$

MOLECULAR STRUCTURAL SPECIES $\qquad$ NUMERICAL VALUE $\qquad\qquad$ COMBUSTION TENDENCY PARAMETER

FIG. 4
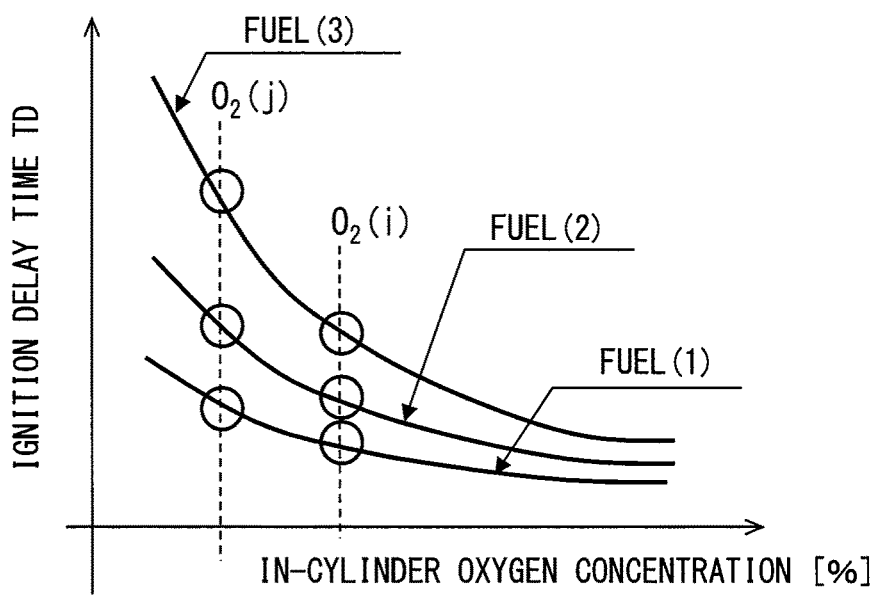
FIG. 5
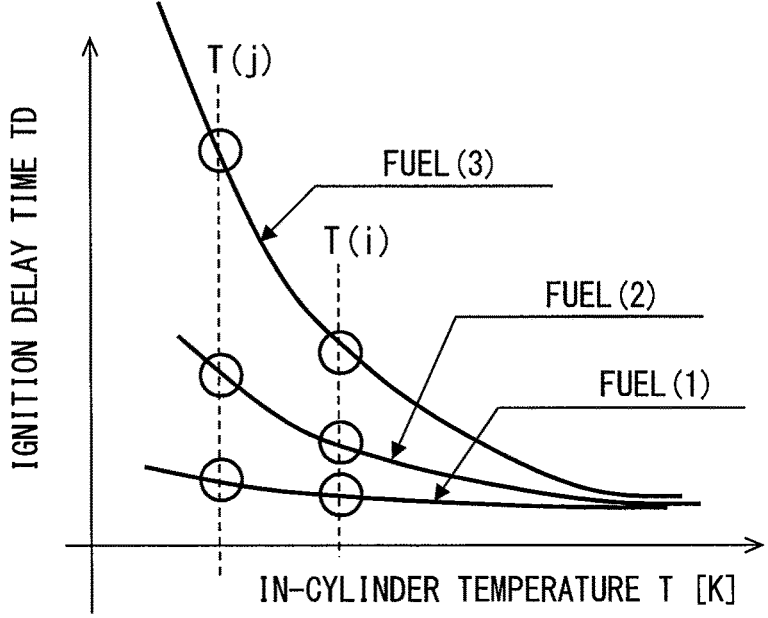
FIG. 6
|  | MOLECULAR STRUCTURAL SPECIES A | MOLECULAR STRUCTURAL SPECIES B | MOLECULAR STRUCTURAL SPECIES C |
| --- | --- | --- | --- |
| FUEL (1) | LARGE | LARGE | SMALL |
| FUEL (2) | SMALL | LARGE | SMALL |
| FUEL (3) | LARGE | SMALL | LARGE |

FIG. 12

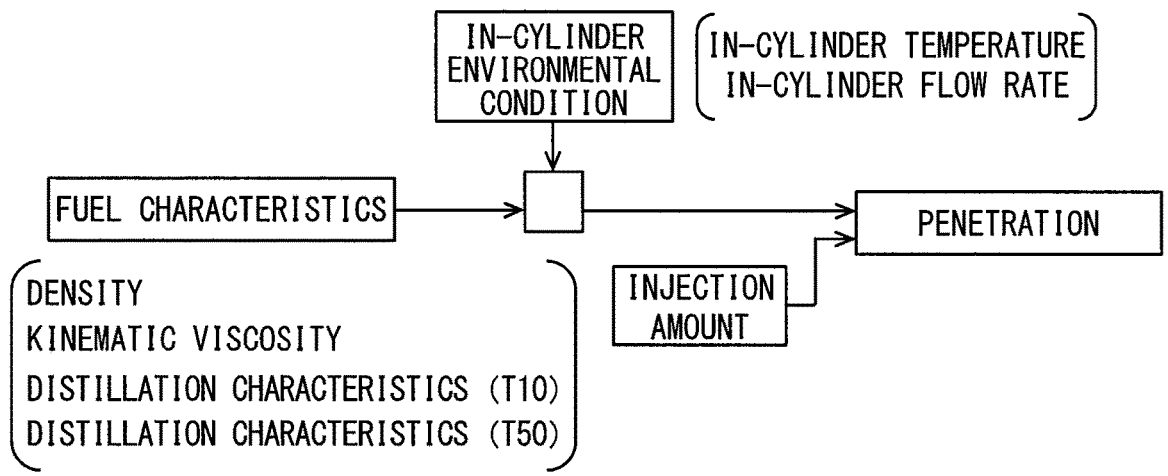

FIG. 13

$$\begin{pmatrix} \text{PENETRATION P1} \\ \text{PENETRATION P2} \\ \text{PENETRATION P3} \\ \ldots \end{pmatrix} = \begin{pmatrix} b_{00} & \cdots & b_{0Y} \\ \vdots & \ddots & \vdots \\ b_{X0} & \cdots & b_{XY} \end{pmatrix} \cdot \begin{pmatrix} \text{KINEMATIC VISCOSITY} \\ \text{DENSITY} \\ \text{DISTILLATION CHARACTERISTICS : T10} \\ \text{DISTILLATION CHARACTERISTICS : T50} \\ \ldots \end{pmatrix}$$

FIG. 14

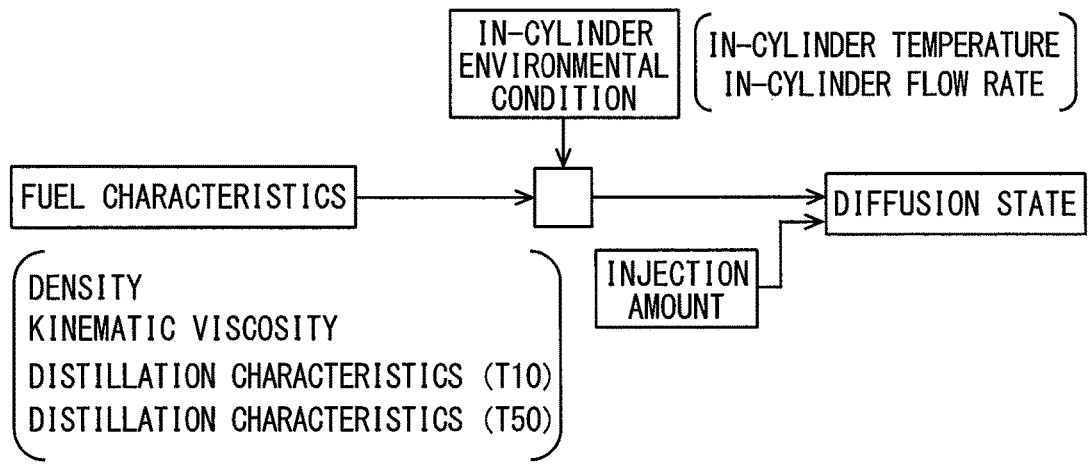

FIG. 15

$$\begin{pmatrix} \text{DIFFUSION STATE D1} \\ \text{DIFFUSION STATE D2} \\ \text{DIFFUSION STATE D3} \\ \cdots \end{pmatrix} = \begin{pmatrix} c_{00} & \cdots & c_{0Y} \\ \vdots & \ddots & \vdots \\ c_{X0} & \cdots & c_{XY} \end{pmatrix} \cdot \begin{pmatrix} \text{KINEMATIC VISCOSITY} \\ \text{DENSITY} \\ \text{DISTILLATION CHARACTERISTICS : T10} \\ \text{DISTILLATION CHARACTERISTICS : T50} \\ \cdots \end{pmatrix}$$

FIG. 16

$$\underbrace{Q_{burn}[J]}_{\substack{\text{COMBUSTION} \\ \text{AMOUNT}}} = \underbrace{\alpha\,[-]}_{\substack{\text{COMBUSTION} \\ \text{RATE}}} \cdot \underbrace{\rho\,[\text{g/mm}^3] \cdot Q_{inj}[\text{mm}^3/\text{st}]}_{\text{INJECTION AMOUNT}} \cdot \underbrace{A\,[\text{J/g}]}_{\substack{\text{LOWER HEAT} \\ \text{GENERATION} \\ \text{AMOUNT}}}$$

FIG. 17

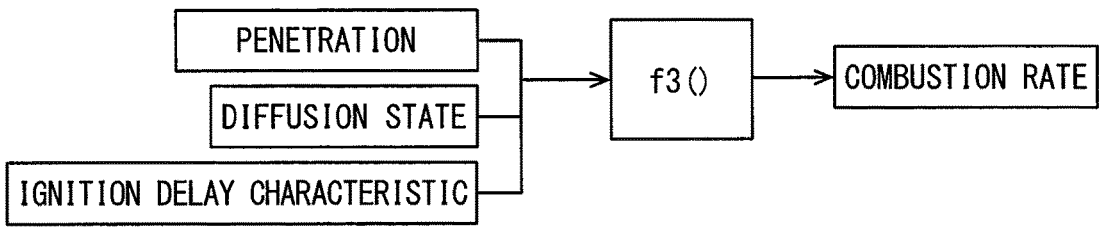

COMBUSTION SYSTEM ESTIMATION DEVICE AND CONTROL DEVICE

This application is the U.S. national phase of International Application No. PCT/JP2016/076880 filed Sep. 13, 2016, which designated the U.S. and claims priority to Japanese Patent Application No. 2015-222316 filed on Nov. 12, 2015, the entire contents of each of which are incorporated herein by reference.

CROSS REFERENCE TO RELATED APPLICATION

This application is based on Japanese Patent Application No. 2015-222316 filed on Nov. 12, 2015, the disclosure of which is incorporated herein by reference.

TECHNICAL FIELD

The present disclosure relates to an estimation device for estimating a combustion state caused by a post injection in a combustion system and to a control device for controlling the combustion system.

BACKGROUND ART

Conventionally, a known technique for a combustion system having an internal combustion engine is multistage injection to inject a fuel into a combustion chamber for multiple times in one combustion cycle. For example, in Patent Literature 1, an injection timing and the like are controlled for post injection among the multistage injection, thereby to enable to increase an unburned fuel in an exhaust gas and to raise an exhaust gas temperature. In the above configuration, a DPF (diesel particulate filter) being a fine particle collecting device is installed in an exhaust passage of the internal combustion engine, and in order to promote combustion of a PM deposited in the DPF, an injection timing of the post injection is set according to a cetane number of the fuel. For example, as the cetane number of the fuel becomes higher, a post injection timing is retarded further, and a post injection amount is set to a smaller value.

PRIOR TECHNICAL LITERATURE

Patent Literature

PATENT LITERATURE 1: Publication of unexamined Japanese patent application No. 2010-96056

However, a fuel having various properties exist as a fuel used for combustion in internal combustion engines. For that reason, components contained in the fuel actually differ from each other, or a mixing ratio of the components is different from each other, even in fuel having the same cetane number. In these cases, even in a case where the injection timing or the like of the post injection is set according to the cetane number, there is a risk that a desired exhaust gas component or exhaust gas temperature cannot be obtained. In other words, in a configuration, in which the post injection is controlled according to the cetane number of the fuel, there is a concern that post-processing of the exhaust gas is not properly performed.

SUMMARY OF INVENTION

It is an object of the present disclosure to produce a combustion system estimation device and a control device enabling to optimize post-processing of an exhaust gas with a post injection.

According to a first aspect of the present disclosure, an estimation device is applicable to a combustion system having an internal combustion engine and comprises a mixing acquisition unit to acquire a mixing ratio of various components contained in fuel used for combustion in the internal combustion engine. The estimation device further comprises a combustion amount estimation unit to estimate a combustion amount of fuel, which is caused by post-combustion generated by injecting fuel into a combustion chamber of the internal combustion engine by post injection, based on the mixing ratio acquired with the mixing acquisition unit. The estimation device further comprises a region estimation unit to estimate a combustion region of the post combustion in the combustion chamber based on the mixing ratio. The estimation device further comprises a timing estimation unit to estimate an ignition timing, at which ignition occurs in the combustion chamber by the post injection, based on the mixing ratio.

According to a second aspect of the present disclosure, a control device is applicable to a combustion system having an internal combustion engine and comprises a mixing acquisition unit to acquire a mixing ratio of various components contained in fuel used for combustion in the internal combustion engine. The control device further comprises a combustion amount estimation unit to estimate a combustion amount of fuel, which is caused by post-combustion generated by injecting fuel into a combustion chamber of the internal combustion engine by post injection, based on the mixing ratio acquired with the mixing acquisition unit. The control device further comprises a region estimation unit to estimate a combustion region of the post combustion in the combustion chamber based on the mixing ratio. The control device further comprises a timing estimation unit to estimate an ignition timing, at which ignition occurs in the combustion chamber by the post injection, based on the mixing ratio. The control device further comprises a combustion control unit to control the combustion system based on respective estimation results of the combustion amount estimation unit, the region estimation unit, and the timing estimation unit.

BRIEF DESCRIPTION OF THE DRAWINGS

The above and other objects, features and advantages of the present disclosure will become more apparent from the following detailed description made with reference to the accompanying drawings. In the drawings:

In the drawings:

FIG. 2 is an illustrative diagram of an ignition delay time;

FIG. 3 is a diagram illustrating a relationship among multiple ignition delay times, parameters representing flammability, and mixing amounts of various components;

FIG. 4 is a diagram showing a relationship between a characteristic line representing a change in the ignition delay time caused due to an in-cylinder oxygen concentration and a molecular structural species of a fuel;

FIG. 5 is a diagram showing a relationship between the characteristic line representing a change in the ignition delay time caused due to an in-cylinder temperature and a molecular structural species of the fuel;

FIG. 6 is a view showing a relationship between a characteristic line specified based on an ignition delay time and a mixing ratio of a molecular structural species;

FIG. 12 is a diagram illustrating estimation of penetration as the injection parameter;

FIG. 13 is a diagram showing a formula for estimating the penetration;

FIG. 14 is a diagram illustrating estimation of a diffusion state as the injection parameter;

FIG. 15 is a diagram showing a formula for estimating the diffusion state;

FIG. 16 is a diagram showing a formula for estimating a combustion amount as the combustion parameter;

FIG. 17 is a diagram showing a formula for estimating a combustion rate;

DESCRIPTION OF EMBODIMENTS

Figure 1:
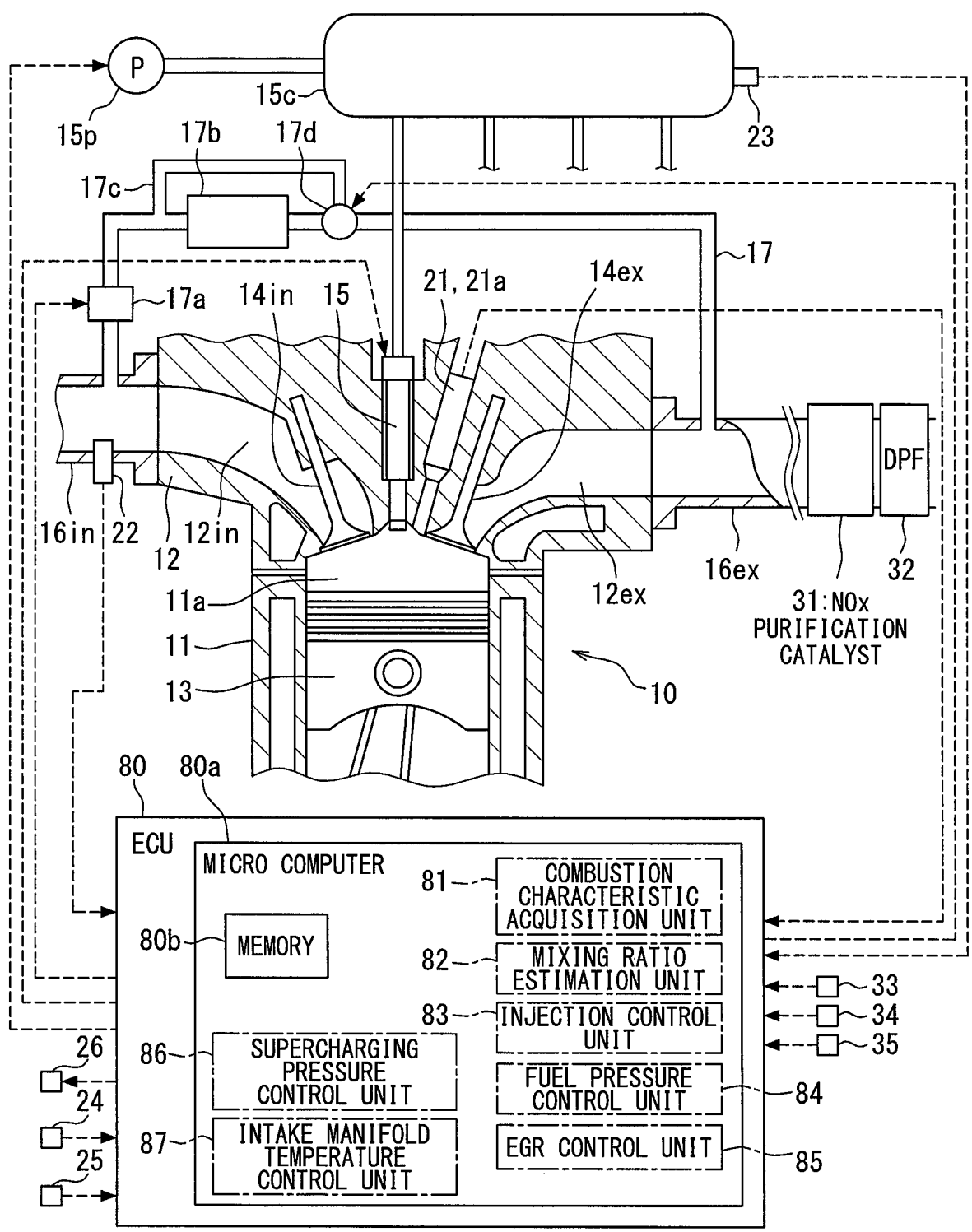
FIG. 1 is a schematic diagram of a combustion system according to a first embodiment.

Hereinafter, multiple embodiments for carrying out the present disclosure will be described with reference to accompanying drawings. In the following description of the embodiments, the same reference numerals will be used to refer to the same and already described elements and description thereof will be omitted in some cases. An estimation device and a control device for a combustion system according to the present embodiment are produced with an electronic control device (ECU 80) shown in FIG. 1.

First Embodiment

An estimation device and a control device for a combustion system according to the present embodiment are produced with an electronic control device (ECU 80) shown in FIG. 1. The ECU 80 includes a microcomputer (microcomputer 80a), an input processing circuit, an output processing circuit, and the like (none shown). The microcomputer 80a includes a central processing unit (CPU) not shown and a memory 80b. The CPU executes a predetermined program stored in the memory 80b, thereby to cause the microcomputer 80a to control the operation of a fuel injection valve 15, a fuel pump 15p, an EGR valve 17a, a temperature control valve 17d, and a supercharging pressure regulator 26 and the like included in the combustion system. Under those controls, a combustion state of the internal combustion engine 10 in the combustion system is controlled in a desired state. The combustion system and the ECU 80 are mounted in a vehicle, and the vehicle travels with the use of an output power of the internal combustion engine 10 as a driving source.

The internal combustion engine 10 includes a cylinder block 11, a cylinder head 12, a piston 13, and the like. An intake valve 14in, an exhaust valve 14ex, a fuel injection valve 15, and an in-cylinder pressure sensor 21 are equipped to the cylinder head 12.

The fuel pump 15p pumps a fuel in the fuel tank to a common rail 15c. The ECU 80 controls the operation of the fuel pump 15p, as a result of which the fuel in the common rail 15c is stored in the common rail 15c in a state where the fuel is maintained at a target pressure Ptrg. The common rail 15c distributes the accumulated fuel to the fuel injection valves 15 of the respective cylinders. The fuel injected from the fuel injection valve 15 mixes with an intake air in the combustion chamber 11a to form an air-fuel mixture, and the air-fuel mixture is compressed by the piston 13 and self-ignited. In short, the internal combustion engine 10 is a compression self-ignition type diesel engine, and a light oil is used as the fuel. Incidentally, as the fuel injection by the fuel injection valve 15, there is spray spraying the fuel in the form of mist.

The fuel injection valve 15 is configured by accommodating an electromagnetic actuator and a valve body inside a body. When the ECU 80 causes the energization of the electromagnetic actuator, an electromagnetic attraction force of the electromagnetic actuator causes a leak passage of a back pressure chamber (not shown) to open. The valve body opens in association with a reduction in the back pressure, and an injection hole provided in the body is opened. Thus, the fuel is injected from the injection hole. When the energization is turned off, the valve body is closed and the fuel injection is stopped.

An intake pipe 16in and an exhaust pipe 16ex are connected to an intake port 12in and an exhaust port 12ex, which are provided in the cylinder head 12, respectively. An EGR pipe 17 is connected to the intake pipe 16in and the exhaust pipe 16ex. A part (EGR gas) of the exhaust gas flows (returns) to the intake pipe 16in through the EGR pipe 17. An EGR valve 17a is equipped to the EGR pipe 17. The ECU 80 controls the operation of the EGR valve 17a, thereby to control an opening degree of the EGR pipe 17, and to control a flow rate of the EGR gas.

Furthermore, an EGR cooler 17b for cooling the EGR gas, a bypass pipe 17c, and a temperature control valve 17d are equipped to an upstream portion of the EGR valve 17a of the EGR pipe 17. The bypass pipe 17c defines a bypass flow channel that causes the EGR gas to bypass the EGR cooler 17b. The temperature control valve 17d adjusts the opening degree of the bypass flow channel, thereby to adjust a ratio between the EGR gas flowing through the EGR cooler 17b and the EGR gas flowing through the bypass flow channel, and finally to adjust a temperature of the EGR gas flowing into the intake pipe 16in. In this example, the intake air flowing into the intake port 12in contains an external air (fresh air) flowing from the intake pipe 16in and the EGR gas. Therefore, the adjustment of the temperature of the EGR gas with the temperature control valve 17d represents the adjustment of the temperature (intake manifold temperature) of the intake air flowing into the intake port 12in.

The combustion system is provided with a supercharger not shown. The supercharger has a turbine that is attached to the exhaust pipe 16ex and a compressor that is attached to the intake pipe 16in. When the turbine rotates due to a flow energy of the exhaust gas, the compressor rotates by the rotational force of the turbine, and the fresh air is compressed (supercharged) by the compressor. The supercharging pressure regulator 26 described above is a device for changing a capacity of the turbine. The ECU 80 controls the operation of the supercharging pressure regulator 26 to adjust the turbine capacity, thereby to control a supercharging pressure caused by the compressor.

In addition, the combustion system includes a NOx purification catalyst 31 and a DPF 32. The NOx purificatalyst 31 includes an adsorption catalyst that adsorbs nitrogen oxide NOx in the exhaust gas, a reduction catalyst that reduces NOx to nitrogen N2, and the like. The DPF 32 (Diesel Particulate Filter) is a fine particle collecting device that is located in the further downstream side of the NOx purification catalyst 31, and collects fine particles contained in the exhaust gas. The exhaust gas flowing through the exhaust pipe 16*ex* passes through both of the NOx purification catalyst 31 and the DPF 32 and is subsequently discharged from a downstream end of the exhaust pipe 16*ex*. In the combustion system, the NOx purification catalyst 31 and the DPF 32 configure an exhaust gas purification device.

The ECU 80 receives detection signals from various sensors such as the in-cylinder pressure sensor 21, an oxygen concentration sensor 22, a rail pressure sensor 23, a crank angle sensor 24, an accelerator pedal sensor 25, an exhaust gas temperature sensor 33, an exhaust gas pressure sensor 34, and a catalyst temperature sensor 35.

The in-cylinder pressure sensor 21 outputs a detection signal corresponding to a pressure (in-cylinder pressure) of the combustion chamber 11*a*. The in-cylinder pressure sensor 21 has a temperature detection element 21*a* in addition to the pressure detection element, and outputs a detection signal corresponding to a temperature (in-cylinder temperature) of the combustion chamber 11*a*. The oxygen concentration sensor 22 is equipped to the intake pipe 16*in* and outputs a detection signal corresponding to an oxygen concentration in the intake air. The intake air to be detected is a mixture of fresh air and EGR gas. The rail pressure sensor 23 is equipped to the common rail 15 *c* and outputs a detection signal corresponding to the pressure (rail pressure) of the accumulated fuel. The crank angle sensor 24 outputs a detection signal corresponding to the rotational speed (engine speed) of the crankshaft that is rotationally driven by the piston 13. The accelerator pedal sensor 25 outputs a detection signal corresponding to the depression amount (engine load) of an accelerator pedal depressed by a vehicle driver.

The exhaust gas temperature sensor 33 is equipped to the exhaust pipe 16*ex*, and detects an exhaust gas temperature. The exhaust gas pressure sensor 34 is equipped to the exhaust pipe 16*ex*, and detects an exhaust gas pressure. The exhaust gas temperature sensor 33 and the exhaust gas pressure sensor 34 are located between the NOx purification catalyst 31 and the turbine in the exhaust pipe 16*ex*.

The catalyst temperature sensor 35 is located between the NOx purification catalyst 31 and the DPF 32 in the exhaust pipe 16*ex* and detects an internal temperature of the NOx purification catalyst 31, thereby to detect the temperature of the exhaust gas that has passed through the NOx purification catalyst 31. The catalyst temperature sensor 35 may be equipped to the NOx purification catalyst 31.

The ECU 80 controls operations of the fuel injection valve 15, the fuel pump 15*p*, the EGR valve 17*a*, the temperature control valve 17*d*, and the supercharging pressure regulator 26, based on the respective detection signals of the sensors 21 to 25 and 33 to 35. In this way, a fuel injection start timing, the injection amount, an injection pressure, an EGR gas flow rate, an intake manifold temperature and a supercharging pressure are controlled.

While controlling the operation of the fuel injection valve 15, the microcomputer 80*a* functions as an injection control unit 83 to control the fuel injection start timing, the injection amount, and the number of injection stages related to the multistage injection. There is a case where the injection control is performed so that the same fuel injection valve 15 injects the fuel for multiple times (multistage injection) during one combustion cycle. The multiple injection include a main injection with the largest injection amount, a pilot injection performed at a timing before the main injection, and a post injection performed at a timing after the main injection.

While controlling the operation of the fuel pump 15*p*, the microcomputer 80*a* functions as a fuel pressure control unit 84 that controls the injection pressure. While controlling the operation of the EGR valve 17*a*, the microcomputer 80*a* functions as an EGR control unit 85 that controls the EGR gas flow rate. While controlling the operation of the temperature control valve 17*d*, the microcomputer 80*a* functions as an intake manifold temperature control unit 87 that controls the intake manifold temperature. While controlling the operation of the supercharging pressure regulator 26, the microcomputer 80*a* functions as a supercharging pressure control unit 86 that controls the supercharging pressure.

The microcomputer 80*a* also functions as a combustion characteristic acquisition unit 81 that acquires a detection value (combustion characteristic value) of a physical quantity relating to combustion. The combustion characteristic value according to the present embodiment represents an ignition delay time TD shown in FIG. 2. An upper part of FIG. 2 shows a pulse signal output from the microcomputer 80*a*. Energization of the fuel injection valve 15 is controlled according to the pulse signal. Specifically, the energization is started at a time point t1 when the pulse is on, and the energization continues in a pulse on period Tq. In short, the injection start timing is controlled according to the pulse on timing. In addition, the injection period is controlled according to the pulse on period Tq, and further, the injection amount is controlled.

A middle part of FIG. 2 shows a change in an injection state of the fuel from the injection hole, which results from the valve opening operation and the valve closing operation of the valve body according to the pulse signal. Specifically, the middle part of FIG. 2 shows a change in the injection amount (injection rate) of the fuel injected per unit time. As shown in the drawing, there is a time lag from the time point t1, when energization is started, to a time period t2 when the injection is actually started. There is also a time lag from an energization completion time point until the injection is actually stopped. A period Tq1 in which the injection is actually performed is controlled according to a pulse on period Tq.

A lower part of FIG. 2 shows a change in the combustion state of the injected fuel in the combustion chamber 11*a*. Specifically, the lower part of FIG. 2 shows a change in heat quantity (heat generation rate) per unit time caused by self-ignition combustion of a mixture of the injected fuel with the intake air. As shown in the drawing, there is a time lag from the time point t2 of the injection start to a time point t3 when the combustion actually starts. In the present embodiment, a time from the time point t1, at which the energization starts, to the time point t3, at which the combustion starts, is defined as an ignition delay time TD.

The combustion characteristic acquisition unit 81 estimates the time point t3, when the combustion starts, based on the change in the in-cylinder pressure detected with the in-cylinder pressure sensor 21. Specifically, during a period, in which a crank angle rotates by a predetermined amount, after the piston 13 has reached a top dead center, a timing at which the in-cylinder pressure suddenly rises is estimated as a combustion start timing (time point t3). The ignition delay time TD is calculated by the combustion characteristic acquisition unit 81 based on the estimation result. Further, the combustion characteristic acquisition unit 81 acquires various states (combustion conditions) at the time of combustion for each combustion. Specifically, the in-cylinder pressure, the in-cylinder temperature, the intake oxygen concentration, and the injection pressure are acquired as combustion conditions.

Those combustion conditions are parameters expressing a flammability of the fuel. The air-fuel mixture is more likely to self-ignite and likely to burn as the in-cylinder pressure immediately before the combustion is higher, as the in-cylinder temperature immediately before the combustion is higher, as the intake oxygen concentration is higher, and as the injection pressure is higher. As the in-cylinder pressure and the in-cylinder temperature just before the combustion, for example, a value detected at the time point t1 at which the energization of the fuel injection valve 15 is started may be used. The in-cylinder pressure is detected with the in-cylinder pressure sensor 21. The in-cylinder temperature is detected with the temperature detection element 21a. The intake oxygen concentration is detected with the oxygen concentration sensor 22. The injection pressure is detected with the rail pressure sensor 23. The combustion characteristic acquisition unit 81 stores the acquired ignition delay time TD in the memory 80b in association to the parameters (combustion conditions) related to the combustion.

The microcomputer 80a also functions as a mixing ratio estimation unit 82 to estimate the mixing ratio of the molecular structural species contained in the fuel based on the multiple combustion characteristic values detected under the different combustion conditions. For example, the microcomputer 80a substitutes the ignition delay time TD for each different combustion condition into a determinant shown in FIG. 3 to calculate the mixing amount of the molecular structural species. The microcomputer 80a divides each of the calculated mixing amounts by the total amount, thereby to calculate the mixing ratio of the molecular structural species.

A matrix on the left side of FIG. 3 has x rows and one column and includes x numbers. Those numerical values represent the mixing amounts of various components. The various components are classified according to the type of molecular structure. Types of molecular structure include linear paraffins, side chain paraffins, naphthenes and aromatics.

The matrix on the left side of the right side is x rows and y columns, and has numerical values such as a00 . . . aXY. Those numerical values are constants determined on the basis of tests conducted in advance. The matrix on the right side of the right hand is y row 1 column and has y numbers. Those numerical values are the ignition delay time TD acquired with the combustion characteristic acquisition unit 81. For example, a numerical value of a first row and a first column represents an ignition delay time TD(i) acquired under a combustion condition i set in a predetermined combination of the parameters, and a numerical value of a second row and the first column represents an ignition delay time TD(j) acquired under a combustion condition j. All of the parameters are set to different values between the combustion condition i and the combustion condition j. Symbols P(i), T(i), O2(i) and Pc(i) in FIG. 3 indicate the in-cylinder pressure, the in-cylinder temperature, the intake oxygen concentration, and the injection pressure under the combustion condition i, respectively. Symbols P(j), T(j), O2(j) and Pc(j) indicate the respective parameters under the combustion condition j.

Subsequently, a description will be made on a theory that the mixing amount of the molecular structural species can be calculated by substituting the ignition delay time TD for each combustion condition in the determinant of FIG. 3 with reference to FIGS. 4, 5, and 6.

As shown in FIG. 4, since the air-fuel mixture is more likely to self-ignite as the concentration of oxygen (in-cylinder oxygen concentration) contained in the air-fuel mixture related to the combustion is higher, the ignition delay time TD becomes shorter. Three solid lines (1), (2) and (3) in the drawing are characteristic lines showing the relationship between an in-cylinder oxygen concentration and the ignition delay time TD. However, the characteristic lines vary depending on the fuel. Strictly, the characteristic lines vary depending on the mixing ratio of the respective molecular structural species contained in the fuel. Therefore, by detecting the ignition delay time TD when the in-cylinder oxygen concentration is O2(i), it can be estimated which molecular structural species is targeted. In particular, by comparing the ignition delay time TD in a case where the in-cylinder oxygen concentration is O2(i) with the ignition delay time TD in a case where the in-cylinder oxygen concentration is O2(j), the mixing ratio can be estimated with higher precision.

Similarly, as shown in FIG. 5, since the self-ignition tends to occur more easily as the in-cylinder temperature becomes higher, the ignition delay time TD becomes shorter. Three solid lines (1), (2) and (3) in the drawing are characteristic lines showing a relationship between the in-cylinder temperature and the ignition delay time TD. However, the characteristic lines vary depending on the fuel. Strictly, the characteristic lines vary depending on the mixing ratio of the respective molecular structural species contained in the fuel. Therefore, by detecting the ignition delay time TD when the in-cylinder temperature is B1, it can be estimated which molecular structural species is targeted. In particular, by comparing the ignition delay time TD in a case where the in-cylinder temperature is T(i) with the ignition delay time TD in a case where the in-cylinder temperature is T(j), the mixing ratio can be estimated with higher precision.

Further, the molecular structural species highly influenced by the characteristic line relating to the in-cylinder oxygen concentration (refer to FIG. 4) is different from the molecular structural species highly influenced by the characteristic line relating to the in-cylinder temperature (refer to FIG. 5). As described above, the molecular structural species having a high degree of influence is different according to the characteristic lines relating to the respective multiple combustion conditions. Therefore, based on the combination of the ignition delay times TD obtained by setting the multiple parameters (combustion conditions) to different values, it can be estimated which of the molecular structural species has a high mixing ratio, for example, as shown in FIG. 6.

The molecular structural species A exemplified in FIG. 6 is a molecular structural species having a high degree of influence on the characteristic line (first characteristic line) related to the in-cylinder oxygen concentration (first parameter). In addition, the molecular structural species B is a molecular structural species having a high degree of influence on the characteristic line (second characteristic line) relating to the in-cylinder temperature (second parameter). The molecular structural species C is a molecular structural species having a high degree of influence on the characteristic line (third characteristic line) relating to the third parameter. The molecular structural species A is mixed more, as a change in the ignition delay time TD appears more with respect to a change in the first parameter. In a similar manner, the molecular structural species B are mixed more, as a change in the ignition delay time TD appears more with respect to a change in the second parameter. The molecular structural species B is mixed more, as a change in the ignition delay time TD appears more with respect to a change in the third parameter. Therefore, the mixing ratio of the molecular structural species A, B, C can be estimated for each of the different fuels (1), (2) and (3).

Subsequently, the processing of a program to be executed by the combustion characteristic acquisition unit 81 will be described. The processing is executed each time a pilot injection is commanded.

First, the combustion characteristic acquisition unit 81 estimates the time point t3 of the combustion start based on the detection value of the in-cylinder pressure sensor 21 as described above, and calculates the ignition delay time TD related to the pilot injection. Subsequently, the combustion characteristic acquisition unit 81 stores the ignition delay time TD in association with the multiple parameters (combustion conditions) in the memory 80b.

Specifically, a numerical range, in which the respective parameters can be, is divided into multiple regions in advance, and the combinations of regions of the multiple parameters are set in advance. For example, the ignition delay time TD(i) shown in FIG. 3 represents the ignition delay time TD acquired under the combination of the regions of P(i), T(i), O2(i), and Pc(i). Likewise, the ignition delay time TD(j) represents the ignition delay time TD acquired under the combination of the regions of P(j), T(j), O2(j), and Pc(j).

If it is highly likely that another fuel has been mixed with the fuel stored in the fuel tank due to refueling by a user, it is assumed that the mixing ratio of the molecular structural species has changed and an estimated value of the mixing amount is reset. For example, the estimated value of the mixing amount is reset when an increase in the remaining fuel level is detected by a sensor that detects the remaining fuel level in the fuel tank at the time of stopping the operation of the internal combustion engine 10.

The combustion characteristic acquisition unit 81 substitutes the ignition delay time TD into the determinant of FIG. 3 to calculate the mixing amount for each molecular structural species. The combustion characteristic acquisition unit 81 changes the number of columns of the matrix representing the constant according to the sampling number, that is, the number of rows of the matrix on the right side of the right member of the determinant. Alternatively, the combustion characteristic acquisition unit 81 substitutes a preset nominal value into the matrix of the ignition delay time TD with respect to the ignition delay time TD that has not been acquired. The combustion characteristic acquisition unit 81 calculates the mixing ratio for each molecular structural species based on the mixing amount, which is calculated in this manner for each molecular structural species.

As described above, the microcomputer 80a also functions as the injection control unit 83, the fuel pressure control unit 84, the EGR control unit 85, the supercharging pressure control unit 86, and the intake manifold temperature control unit 87. Those control units set target values on the basis of an engine speed, an engine load, an engine coolant temperature and the like and perform a feedback control so that a control target has a target value. Alternatively, those control units performs an open control according to contents corresponding to the target value.

The injection control unit 83 sets the pulse signal of FIG. 2 so that the injection start timing, the injection amount, and the injection stage number become the target values, thereby to control (injection control) the injection start timing, the injection amount, and the injection stage number. The number of injection stages is the number of injections pertaining to the multistage injection described above. Specifically, the injection control unit 83 stores an ON time (energization time) and a pulse ON rise timing (energization start timing) of the pulse signal corresponding to the target value on a map in advance. The injection control unit 83 acquires the energization time and energization start timing corresponding to the target value from the map and sets a pulse signal.

In addition, the injection control unit 83 stores the output torque generated by the injection, emission state values such as the NOx amount and the PM amount in advance. In setting the target value based on the engine speed, the engine load and the like in next and subsequent injections, the injection control unit 83 corrects the target value based on the values stored as described above. In short, the injection control unit 83 corrects the target value so as to make a deviation between the actual output torque or emission state value, and the desired output torque or emission state value zero, and performs the feedback control.

The fuel pressure control unit 84 controls the operation of a metering valve that controls a flow rate of the fuel drawn into the fuel pump 15p. More specifically, the fuel pressure control unit 84 feedback controls the operation of the metering valve based on the deviation between the actual rail pressure detected with the rail pressure sensor 23 and the target pressure Ptrg (target value). As a result, the discharge amount per unit time by the fuel pump 15p is controlled, and the actual rail pressure is kept at the target value under the control (fuel pressure control).

The EGR control unit 85 sets a target value of the EGR amount based on the engine speed, the engine load, and the like. The EGR control unit 85 controls the EGR amount while controlling (EGR control) the valve opening degree of the EGR valve 17a based on the target value. The supercharging pressure control unit 86 sets a target value of the supercharging pressure based on the engine speed, the engine load, and the like. The supercharging pressure control unit 86 controls the supercharging pressure while controlling (supercharging pressure control) the operation of the supercharging pressure regulator 26 based on the above target value. The intake manifold temperature control unit 87 sets a target value of the intake manifold temperature based on the outside air temperature, the engine speed, the engine load, and the like. The intake manifold temperature control unit 87 controls the intake manifold temperature while controlling (intake manifold temperature control) the valve opening degree of the temperature control valve 17d based on the above target value.

In this example, the microcomputer 80a functions as the injection control unit 83, thereby to execute a post control process of controlling the post injection. In this example, the post control process will be described with reference to a flowchart of FIG. 7. The above process is repeatedly executed in a predetermined cycle during the operation period of the internal combustion engine 10.

Figure 7:
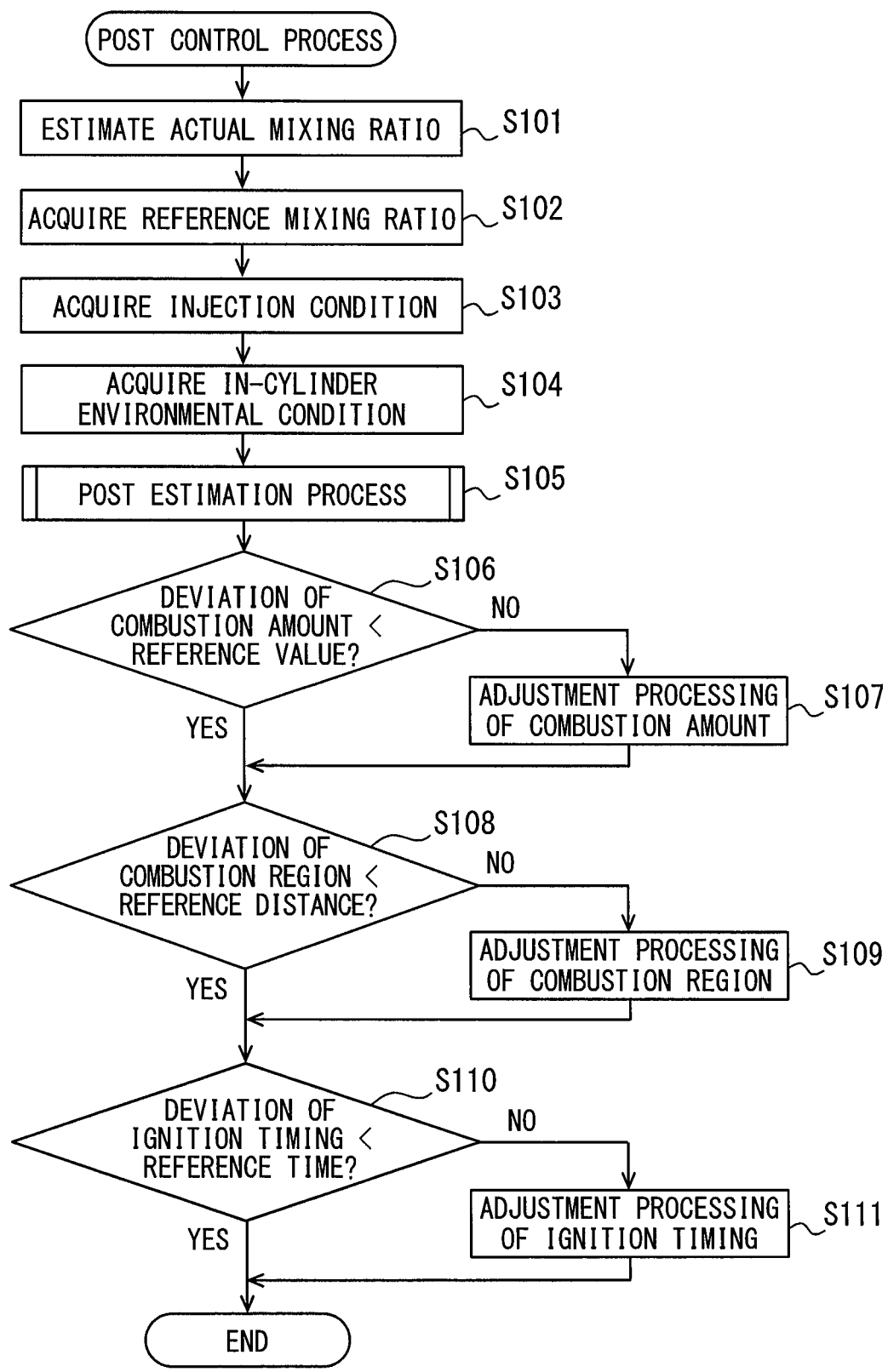
FIG. 7 is a flowchart showing a procedure of a post control process.

First, in step S101 of FIG. 7, the mixing ratio (an actual mixing ratio) estimated with the mixing ratio estimation unit 82 is acquired. In other words, the mixing ratio for each molecular structural species shown on the left side of FIG. 3 is acquired. On the other hand, a reference value (reference mixing ratio) of the mixing ratio for each molecular structural species is set in advance and stored in the memory 80b. Those reference mixing ratios are set in consideration of the fuel that is distributed in countries or regions where the vehicle device is used. In the present step S101, the amounts of grouped molecular structural species such as linear paraffins, side chain paraffins, and naphthenes, aromatics are estimated. Step S101 corresponds to a mixing acquisition unit.

In step S102, the reference mixing ratio is read from the memory 80b and acquired. In step S103, injection conditions for the post injection are acquired. Examples of the injection conditions include a rail pressure, which is a fuel pressure in the common rail 15c, a target injection amount, which is a target value of the injection amount, an energization period for the fuel injection valve 15, a needle lift amount of the fuel injection valve 15, and the like. The rail pressure is an injection pressure under the combustion condition.

In step S104, the in-cylinder environmental conditions, in the case where the post injection is performed, are acquired. Examples of the in-cylinder environmental conditions include the in-cylinder temperature, which is the temperature of the combustion chamber 11a, the in-cylinder oxygen concentration, which is the oxygen concentration of the combustion chamber 11a, the in-cylinder flow rate, which is the flow rate of the air-fuel mixture in the combustion chamber 11a. The in-cylinder temperature is also included in the combustion conditions. Further, the in-cylinder oxygen concentration is acquired based on the intake oxygen concentration included in the combustion conditions.

In step S105, a post estimation process is performed. The post estimation process will be described with reference to a flowchart of FIG. 8. In this example, the combustion of fuel by the post injection is referred to as post combustion, and a state of the post combustion is referred to as a post combustion state. In this case, even in a case where the fuel has the same property (for example, cetane number), if the mixing ratio of the molecular structural species contained in the fuel is different between the fuels, the post combustion state is different from each other. In the post estimation process, a state of the post injection or the post combustion is estimated, and a state of the exhaust emission is estimated based on the estimation result.

Figure 8:
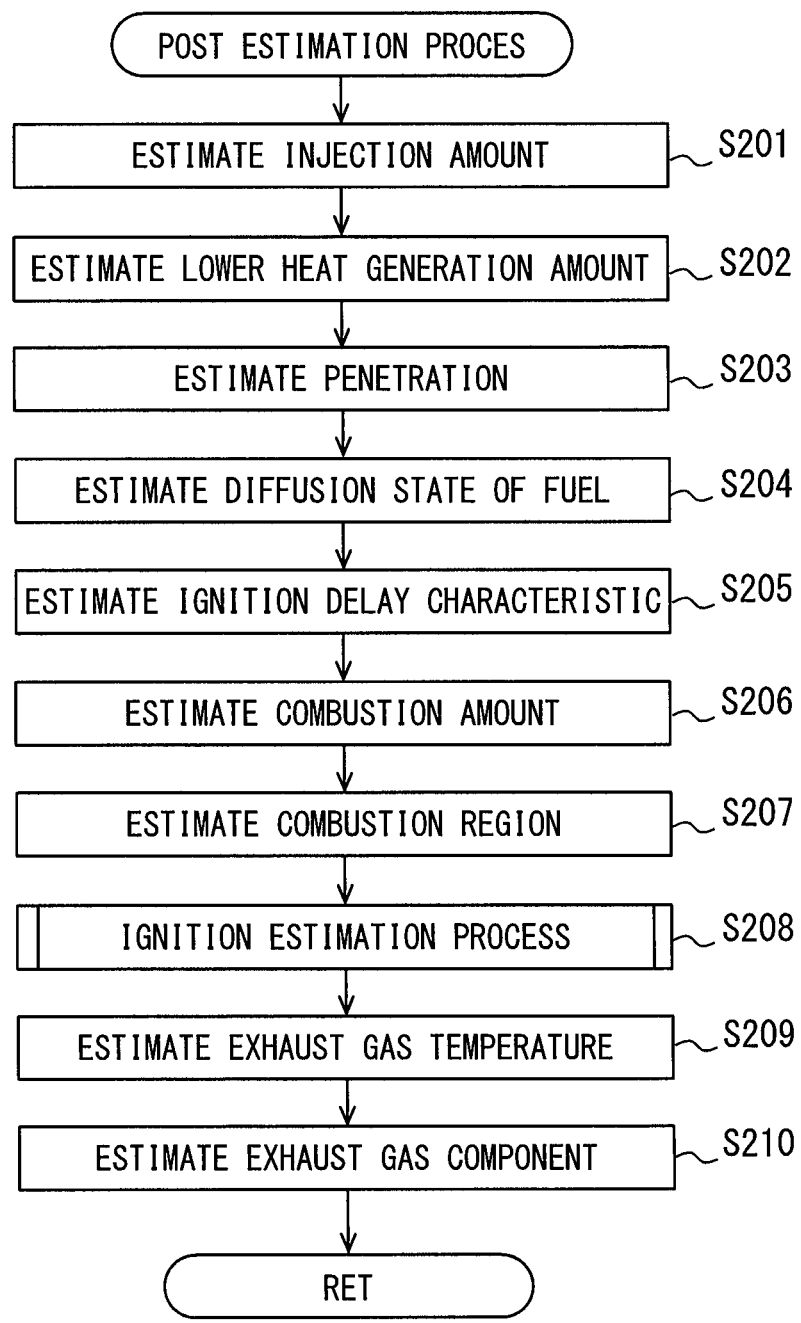
FIG. 8 is a flowchart showing a procedure of a post estimation process.

Referring to FIG. 8, in steps S201 to S205, the injection state of the post injection is estimated based on the actual mixing ratio of the molecular structural species acquired in step S101. The injection parameters indicating the injection state of the post injection include five parameters including an injection amount, a lower heat generation amount, a penetration, a diffusion state, and an ignition delay characteristic. For the reference fuel having the reference mixing ratio, the values of the respective injection parameters corresponding to the in-cylinder environment are acquired in advance by conducting an experiment or the like, and those acquired data are stored in the memory 80b as reference data. For the actual fuel having the actual mixing ratio, the value of each injection parameter is estimated with comparison with the reference data.

Figure 9:
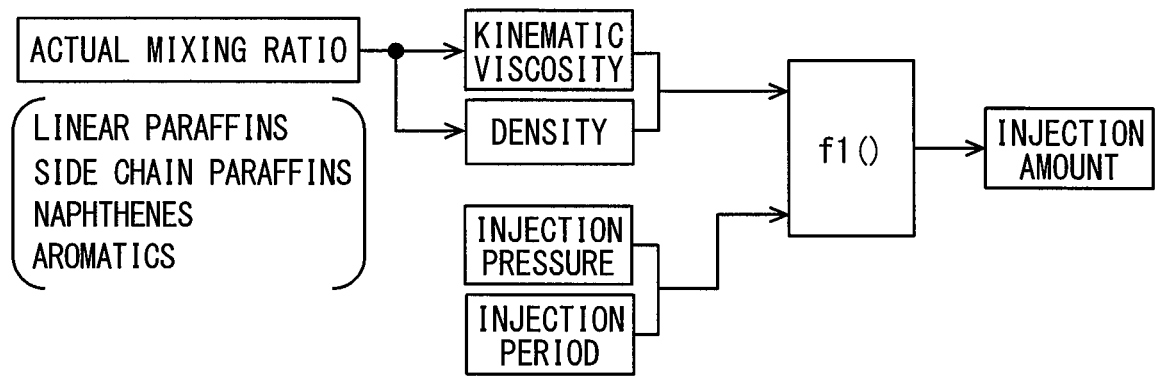
FIG. 9 is a diagram illustrating estimation of an injection amount as an injection parameter.

In step S201, the injection amount of the post injection is estimated based on the actual mixing ratio. In this example, as shown in FIG. 9, a kinematic viscosity and a density among the general properties of the fuel are estimated on the basis of the actual mixing ratio, and the injection amount is estimated with the use of a predetermined function f1( ) for the kinematic viscosity and the density as well as the injection pressure and the injection period of the injection conditions. In that case, the kinematic viscosity and the density are parts of the fuel characteristics, which are chemically affected, and the injection pressure and the injection period are parts of the use conditions and the environmental conditions, which are physically affected. Step S201 corresponds to an injection amount estimation unit. Further, in the estimation of the injection amount, an estimation model such as a multiple regression model or a map may be used in place of the function f1( ). Furthermore, the pulse on period Tq may be used as the injection period.

Figure 10:
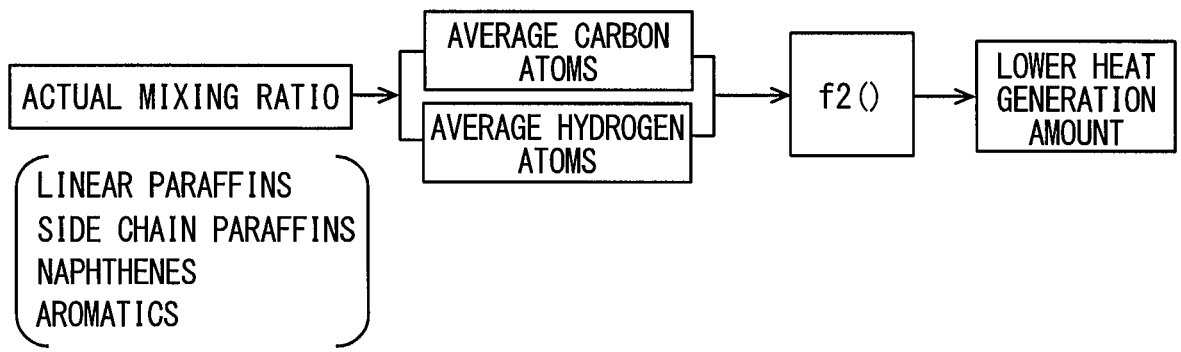
FIG. 10 is a diagram illustrating estimation of a lower heat generation amount as the injection parameter.

In step S202, the lower heat generation amount of the actual fuel is estimated based on the actual mixing ratio. In this example, as shown in FIG. 10, an average number of carbon atoms and an average number of hydrogen atoms of the actual fuel are estimated based on an actual mixing ratio, and the lower heat generation amount is estimated with the use of a predetermined function f2( ) for the average number of carbon atoms and the average number of hydrogen atoms. In this case, the average number of carbon atoms and the average number of hydrogen atoms are determined according to the fuel characteristics which are chemically affected. When the lower heat generation amount is estimated, an estimation model, a map, or the like may be used instead of the function f2( ). Incidentally, step S202 corresponds to a heat generation amount estimation unit.

In step S203, the penetration of the fuel by the post injection is estimated based on the actual mixing ratio. The penetration is a penetration force indicating a force by which the fuel injected from the fuel injection valve 15 goes straight through the combustion chamber 11a. The penetration of the injected fuel tends to decrease more, as an evaporation amount in the combustion chamber 11a increases more. Therefore, by estimating the volatility of the fuel based on the multiple distillation characteristics, the penetration of the fuel is estimated. Step S203 corresponds to a penetration force estimation unit.

Figure 11:
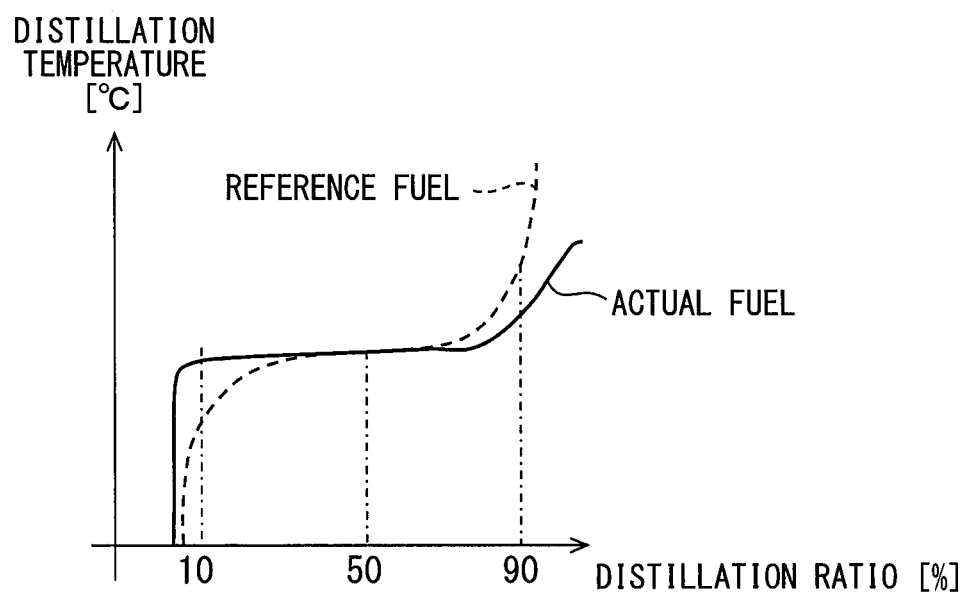
FIG. 11 is a diagram illustrating distillation characteristics.

As shown in FIG. 11, in the comparison between a reference fuel at a reference mixing ratio and an actual fuel at an actual mixing ratio, even in a case where the distillation characteristics T50, at which evaporating by 50%, are the same between the reference fuel and the actual fuel, the distillation characteristics T10 and T90 may be different between the reference fuel and the actual fuel. In that case, by estimating the penetration of the fuel based on the multiple distillation characteristics, the estimation precision can be increased. In addition, the distillation characteristics T50 per se may be different greatly between the reference fuel and the actual fuel. For that reason, by comparing and estimating the distillation characteristics T50, which are the average distillation characteristics, according to the average number of carbon atoms for fuel, the estimation precision of the penetration can be enhanced.

In the fuel diffused in the combustion chamber 11a by being injected, a momentum becomes larger, as a mass of particles is larger, and the penetration tends to increase. In this case, the fuel having a higher kinematic viscosity and being less likely to be atomized tends to have a larger fuel density in spray, and the mass of the particles tends to increase. In particular, a shear force of the fuel to an air, an injection speed of the fuel in the injection hole, a density of the fuel, and the like are susceptible to the kinematic viscosity and the viscosity. In addition, the shear force of the fuel is susceptible to the in-cylinder pressure, and the shear force of the fuel tends to become higher, as the in-cylinder pressure is higher. In the fuel, the particles lose their mass more, as the volatility is higher, and the momentum becomes smaller. For example, a fuel at a low temperature from an initial boiling point of the distillation characteristics to a temperature T50 relatively trends to vaporize, and the penetration tends to be small.

In step S203, as shown in FIG. 12, the penetration is estimated based on the fuel characteristics including the density, the kinematic viscosity, and the multiple distillation characteristics, the in-cylinder environment including the in-cylinder temperature and the in-cylinder flow rate, and the injection amount estimated in step S201. The penetration is influenced by the in-cylinder environmental conditions and the injection conditions, and can be estimated with a mathematical formula as shown in FIG. 13. In the formula, penetration P1, P2, P3 . . . according to the in-cylinder environmental conditions and the injection conditions are estimated based on a predetermined constant b and the fuel characteristics such as the kinematic viscosity. The constant b includes x rows and y columns and is, for example, a matrix having numerical values b00 . . . bXY.

It is possible to estimate a provisional penetration based on the actual mixing ratio and to correct the provisional penetration with the injection amount, thereby to estimate the penetration. The distillation characteristics are estimated based on the actual mixing ratio contained in the fuel. For that reason, the fuel characteristics also include a factor of the actual mixing ratio in addition to general characteristics such as the density, the kinematic viscosity and the distillation characteristics.

Returning to FIG. 8, in step S204, a diffusion state of the fuel injected in the post injection is estimated based on the actual mixing ratio. The diffusion state is a degree of diffusion indicating how much the injected fuel diffuses. The injected fuel is likely to diffuse, as the evaporation amount in the combustion chamber 11a further increases. Therefore, as with the penetration, the volatility of the combustion is estimated based on the multiple distillation characteristics to estimate the diffusion state of the fuel. Incidentally, step S204 corresponds to a diffusion estimation unit.

In step S204, as shown in FIG. 14, the diffusion state is estimated based on the fuel characteristics including the density, the kinematic viscosity, and the multiple distillation characteristics, the in-cylinder environment including the in-cylinder temperature and the in-cylinder flow rate, and the injection amount estimated in step S201. The diffusion state is influenced by the in-cylinder environmental conditions and the injection conditions, and can be estimated with a mathematical formula as shown in FIG. 15. In the formula, diffusion states D1, D2, D3 . . . according to the in-cylinder environmental conditions and the injection conditions are estimated based on a predetermined constant c and the fuel characteristics such as the kinematic viscosity. The constant c includes x rows and y columns, and is, for example, a matrix having numerical values c00 . . . cXY.

The diffusion state can also be calculated with the use of a well-known mathematical formula showing the momentum theory of spraying.

In step S205, the ignition delay characteristic of the actual fuel is estimated based on the actual mixing ratio. The ignition delay characteristic is a characteristic indicating tendency of the ignition. For example, the ignition delay characteristic is expressed by a time required for the ignition of the fuel to start in a state where the in-cylinder environment promotes the ignition. Examples of a state in which the in-cylinder environment promotes the ignition include a state in which the in-cylinder temperature and the in-cylinder pressure are sufficiently high for generation of the ignition, and the like. Step S205 corresponds to an ignition delay estimation unit.

In steps S206 to S208, the combustion state of the fuel by the post injection is estimated with the use of each injection parameter estimated in steps S201 to S205. The combustion parameters indicating the combustion state include three parameters including a combustion amount, a combustion region, and an ignition timing. In the reference fuel, the values of the respective combustion parameters corresponding to the in-cylinder environment are acquired in advance by conducting an experiment or the like, and as with the injection parameters, those acquired data are stored in the memory 80b as the reference data. The actual fuel is compared with reference data to estimate a value of each combustion parameter. The ignition timing corresponds to an ignition delay time TD.

In step S206, the combustion amount by the post injection is estimated. In the estimation of the combustion amount, all of the five injection parameters including the injection amount, the lower heat generation amount, the penetration, the diffusion state, and the ignition delay characteristic are used. For example, the combustion amount is calculated with the use of a mathematical formula shown in FIG. 16. In the formula, Qburn is the combustion amount, $\alpha$ is the combustion rate, $\rho \times Qinj$ is the injection amount estimated in step S201, and A is the lower heat generation amount estimated in step S202. As shown in FIG. 17, the combustion rate $\alpha$ is estimated with the use of a predetermined function f3( ) for the penetration estimated in step S203, the diffusion state estimated in step S204, and the ignition delay characteristic estimated in step S205. A spray volume of the post injection is also estimated with the use of the penetration and the diffusion state. Step S206 corresponds to a combustion amount estimation unit.

In step S207, the combustion region caused by the post injection is estimated. Estimation of the combustion region uses four of the five injection parameters including the injection amount, the penetration, the diffusion state, and the ignition delay characteristic. For example, the combustion region is estimated with the use of predetermined functions, maps, models, or the like on the injection amount, the penetration, the diffusion state, and the ignition delay characteristic. Step S207 corresponds to a region estimation unit.

In step S208, an ignition estimation process for estimating the ignition timing caused by the post injection is performed. The ignition estimation process will be described with reference to the flowchart of FIG. 18.

Figure 18:
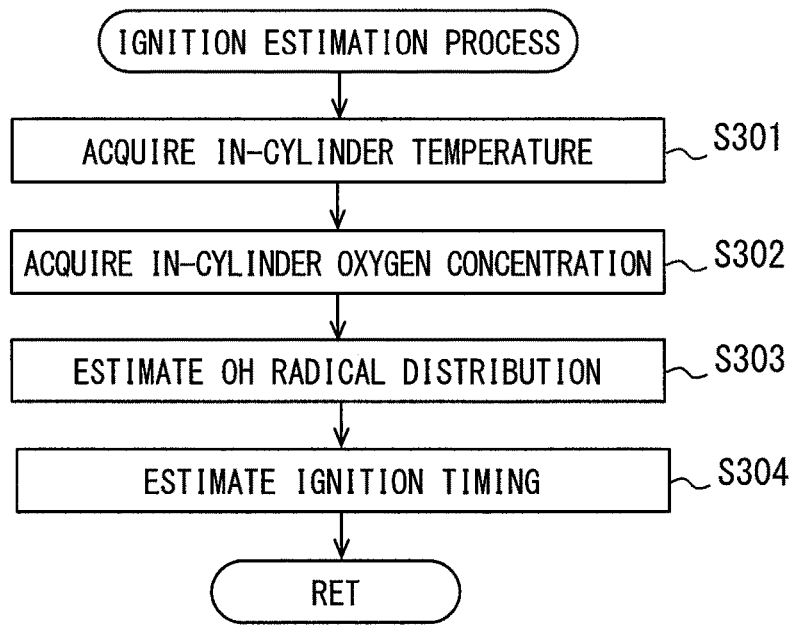
FIG. 18 is a flowchart showing a procedure of an ignition estimation process.

In FIG. 18, in step S301, the in-cylinder temperature is acquired as the in-cylinder environmental condition, and in step S302, the in-cylinder oxygen concentration is acquired as the in-cylinder environmental condition. In step S302, the oxygen amount in the combustion chamber 11a may be acquired as the in-cylinder oxygen amount as the in-cylinder environmental condition. In addition, step S301 corresponds to the temperature acquisition unit, and step S302 corresponds to an oxygen acquisition unit.

In step S303, a generation state of OH radicals in the combustion chamber 11a is estimated as an OH radical distribution on the basis of the actual mixing ratio, the in-cylinder temperature, and the in-cylinder oxygen concentration at a timing at which the post injection is performed. Examples of the OH radical distribution include a density, an amount, and a position of the OH radical. As the position of the OH radicals, the position of the center of gravity of a region, where the OH radicals are produced, is taken. Step S303 corresponds to an OH radical estimation unit. Alternatively, the OH radical distribution may be estimated based on the injection pressure in addition to the actual mixing ratio, the in-cylinder temperature, and the in-cylinder oxygen concentration.

In this example, the pilot injection performed while the in-cylinder temperature is rising, the main injection, the after-injection, and the post injection performed while the in-cylinder temperature is decreasing are performed in the stated order in one combustion cycle. The in-cylinder oxygen concentration is largest at a timing when the pilot injection is performed, decreases in the order of the main injection and the after-injection, and is smallest at a timing when the post injection is performed.

The in-cylinder temperature is lowest at a timing when the pilot injection is performed after intake starts, and rises to a sufficiently high temperature at a timing when the main injection and the after-injection are performed. Thereafter, the in-cylinder temperature decreases with an increase in a cylinder capacity in an expansion stroke of the piston, and becomes an intermediate temperature higher than the temperature at the timing when the pilot injection is performed, at the timing when the post injection is performed. In the combustion chamber 11a, for example, a low temperature range is set to 900K or lower, a medium temperature range is set to 900K to 1100K, and a high temperature range is set to 1100K or higher.

In one combustion cycle, chemical combustion is started by oxidation of combustible molecules such as ketone and aldehyde, with the generation of the OH radicals caused by the injection of the fuel. Examples of reactions for generating the OH radicals include a decomposition reaction, in which hydrogen peroxide $H_2O_2$ produced from inert $HO_2$ radicals and alkene is decomposed into the OH radicals, and a chain branching reaction in which the generation and consumption of the OH radicals are repeated in a process where oxygen is given to hydrocarbons to produce combustible molecules. In the chain branching reaction, the generation amount and the consumption amount of the OH radicals are almost identical with each other. Estimation of the components contributing to the OH radicals is synonymous with the estimation of the generation amount of the combustible molecules.

Each molecular structural species of the fuel contains a produced molecule that is likely to produce the OH radicals in a process of a chain branching reaction and an inhibitor molecule that is unlikely to produce the OH radicals. The produced molecules include linear paraffins, and inhibitor molecules include aromatics. In the fuel, in not only the chain branching reaction but also any reactions, the ease of ignition varies depending on the density distribution between the produced molecule and the inhibitor molecule. However, when the decomposition of $H_2O_2$ is excessive in the high temperature range, the ignition timing varies depending on the generation state of the OH radicals and fluid turbulence inside and outside the spray. The density distribution between the produced molecule and the inhibitor molecule affects the generation position of the OH radical distribution produced by the chain branching reaction along a time series, and the mode of occurrence of the chain branching reaction is correlated with the fuel component.

Figure 19:
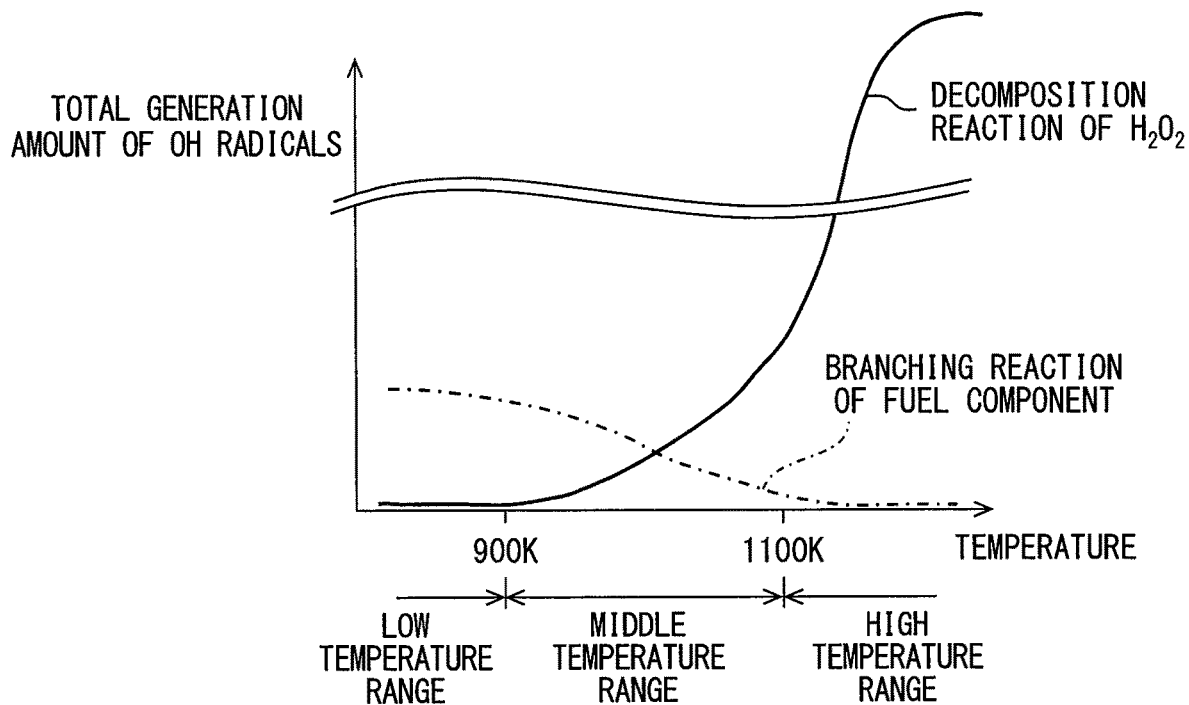
FIG. 19 is a diagram illustrating a generation amount of OH radicals.

Ease of ignition caused by the injection of the fuel varies depending on which temperature range, to which the in-cylinder temperature belongs at that time. As shown in FIG. 19, in the low temperature range where the in-cylinder temperature is 900K or lower, $H_2O_2$ is hardly decomposed, and the generation amount of the OH radicals caused by the decomposition reaction of $H_2O_2$ is very small. On the other hand, among the fuel components, the chain branching reactions caused by the components capable of extracting hydrogen by intramolecular isomerization and having a structure with a small strain energy are likely to occur, and the generation amount of the OH radicals involved in the chain branching reaction is relatively increased. In that case, a large number of produced molecules tend to cause the chain branching reaction, and the decomposition reaction of $H_2O_2$ hardly occurs.

To this issue, the inventors have acquired knowledge that the degree of dependence of the ignition timing on the fuel component is high in the low temperature range which is the temperature range where the pilot injection is performed. In this case, as compared with a case, in which $H_2O_2$ is forcibly decomposed into combustible molecules such as ketone and aldehyde with 1 to 3 carbon atoms (C1 to C3) due to the OH radical production and 13 cleavage accompanying the decomposition of $H_2O_2$ at the high temperature to perform ignition, the ignition delay tends to occur depending on the actual mixing ratio.

As the in-cylinder temperature rises from the low temperature range, the amount of OH radicals generated by the chain branching reaction gradually decreases, and the amount of OH radicals produced by the decomposition reaction of $H_2O_2$ abruptly increases.

For example, in the medium temperature range where the in-cylinder temperature is 900K to 1100K, although $H_2O_2$ tends to be decomposed, the amount of OH radicals generated by the decomposition reaction of $H_2O_2$ does not increase sharply even though the temperature rises. In that case, the amount of OH radicals produced by the decomposition reaction of $H_2O_2$ is larger than the OH radicals generated by the chain branching reaction by the fuel component. Before a structure with small strain energy causing the chain branching reaction is formed, the number of molecules having an average number of carbon atoms of 1 to 3 increases, and the chain branching reaction gradually decreases.

To this issue, the present inventors have acquired knowledge that an ignition delay, which depends on molecules produced as a fuel component causing the chain branching reaction, and an ignition delay, which is caused by the decomposition reaction of $H_2O_2$ having no sensitivity in a fuel component such as the produced molecule, are required to be taken into consideration for the ignition timing in the medium temperature range which is a temperature range where the post injection is performed. For that reason, in the medium temperature range, the dependence of the ignition timing on the fuel component is lower than that in the low temperature range where the pilot injection is performed, and the post injection is less likely to cause the ignition delay than the pilot injection depending on the actual mixing ratio.

Also, in a high temperature range where the in-cylinder temperature is 1100K or higher, $H_2O_2$ is likely to decompose, and the amount of OH radicals generated by the decomposition reaction of $H_2O_2$ abruptly increases as the temperature rises. On the other hand, the number of molecules causing the chain branching reaction by the fuel component decreases, and the amount of OH radicals generated by the chain branching reaction is very small. To this issue, the present inventors have acquired knowledge that the ignition timing is hardly influenced by the chemical combustion of the fuel in the high temperature range where the main injection and the after-injection are performed. For that reason, depending on the actual mixing ratio, the main injection and the after-injection are less likely to cause the ignition delay than the post injection.

Returning to FIG. 18, in step S 304, the ignition timing by the post injection is estimated. To estimate the ignition timing, three of the five injection parameters including the injection amount, the diffusion state, and the ignition delay characteristic are used. The OH radical distribution is used for the estimation of the ignition timing in addition to the three injection parameters. For example, the provisional ignition timing is estimated with the use of a predetermined function, map, or model for the injection amount, the diffusion state, and the ignition delay characteristic, and the provisional ignition timing is corrected according to the weight distribution of the molecular structure amount configuring the OH radical distribution to estimate the ignition timing. Step S 304 corresponds to a timing estimation unit.

Returning to FIG. 8, in step S209, the exhaust gas temperature is estimated with the use of the respective combustion parameters estimated in steps S206 to S208. In this example, in an exhaust stroke of the combustion cycle, a timing, at which the opening of the exhaust valve 14*ex* is started, is acquired as an opening timing, and the exhaust gas temperature is estimated based on the opening timing of the exhaust valve 14*ex* in addition to the respective combustion parameters. Further, the exhaust gas temperature before the opening of the exhaust valve 14*ex* is started is estimated in advance, and the amount of increase in the exhaust gas temperature after the exhaust valve 14*ex* has been opened is estimated.

In step S210, the exhaust gas component is estimated with the use of the respective combustion parameters estimated in steps S206 to S208 as in step S209. In this example, as in step S209, the exhaust gas component is estimated based on the opening timing of the exhaust valve 14*ex* in addition to the respective combustion parameters.

Returning to FIG. 7, in step S106, the combustion amount of the reference fuel is read from the memory 80*b*, a "deviation" between the combustion amount of the reference fuel and the combustion amount of the actual fuel is calculated as a difference, and it is determined whether the difference is smaller than a predetermined reference amount, or not. The difference in this case is an absolute value of the difference between the combustion amount of the reference fuel and the combustion amount of the actual fuel.

In this example, a target value of the combustion parameter such as the combustion amount caused by the post injection is set according to an operation state of the internal combustion engine 10 and a state of an exhaust gas purification device, and a determination criterion of the difference is set according to the target value of the combustion parameter. For example, when the temperature of the NOx purification catalyst 31 is lower than a temperature suitable for the NOx reduction just after the engine starts, the target value of the combustion parameter is set so that the temperature of the NOx purification catalyst 31 detected with the catalyst temperature sensor 35 increases. In addition, when a DPF regeneration for burning the PM trapped by the DPF 32 is performed, the target value of the combustion parameter is set so that the exhaust gas temperature detected with the exhaust gas temperature sensor 33 becomes a temperature suitable for regenerating the DPF. When the target value of the combustion parameter is set for the NOx purification or the DPF regeneration, the determination criterion of the difference is set to a large value, as compared with a case where the target value of the combustion parameter is set according to the driver's driving operation irrespective of the NOx purification or the DPF regeneration.

When the difference in the combustion amount is not smaller than the reference amount, the process proceeds to step S107, and a process of adjusting the combustion amount is performed so that the difference becomes smaller than the reference amount. In this example, when the combustion amount of the actual fuel is smaller than the combustion amount of the reference fuel, an increasing process for increasing the combustion amount is performed, and when the combustion amount of the actual fuel is larger than the combustion amount of the reference fuel, a decreasing process for decreasing the combustion amount is performed. Examples of the increasing process include a process of increasing the injection amount, a process of increasing the injection pressure, a process of shifting the injection timing toward a top dead center TDC side of the piston 13, a process of lowering the EGR rate, and the like. Examples of the decreasing process include a process of decreasing the injection amount, a process of lowering the injection pressure, a process of shifting the injection timing toward a bottom dead center BDC side of the piston 13, a process of increasing the EGR rate, and the like.

In the process of adjusting the combustion amount, the target value, which is for reducing the difference of the combustion amount to be smaller than the reference amount, is set based on the actual mixing ratio. In that case, a provisional target value is acquired based on the reference mixing ratio, and the provisional target value is corrected with the use of the actual mixing ratio to calculate the target value. For example, in the process of increasing the injection amount, the target value of the injection amount is acquired with the use of the reference mixing ratio, and based on a difference between the combustion amount and the reference amount, and the provisional target value is corrected based on the actual mixing ratio to calculate the target value. As a result, the issue that the injection amount is insufficient due to the actual mixing ratio although the process of increasing the injection amount has been performed is restricted.

When the difference in the combustion amount is smaller than the reference amount, it is determined that the process of adjusting the combustion amount is unnecessary, and the process proceeds directly to step S108.

In step S108, the combustion region of the reference fuel is read from the memory 80*b*, a "deviation" between the combustion region of the reference fuel and the combustion region of the actual fuel is calculated as a difference, and it is determined whether the difference is smaller than a predetermined reference distance, or not. The difference in that case represents an absolute value of a separation distance between a tip of the combustion region of the reference fuel and a tip of the combustion region of the actual fuel in an extending direction of the injection hole of the fuel injection valve 15.

When the difference in the combustion region is not smaller than the reference distance, the process proceeds to step S109, and a process of adjusting the combustion region is performed so that the difference becomes smaller than the reference distance. In this example, when the tip of the combustion region of the actual fuel is located at a position farther from the tip of the fuel region of the reference fuel with respect to the injection hole as a reference, an approach process is performed to bring the tip of the combustion region of the actual fuel close to the injection hole. In addition, when the tip of the combustion region of the actual fuel is located at a position closer to the tip of the combustion region of the reference fuel relative to the injection hole as the reference, a separation process is performed to move the tip of the combustion region of the actual fuel away from the injection hole. Examples of the approach process include a process of increasing the number of injection stages of the post injection and a process of shifting the injection timing toward the TDC side. Examples of the separation process include a process of decreasing the number of injection stages of the post injection and a process of shifting the injection timing toward the BDC side. In the configuration, in which a glow plug is provided in the combustion chamber 11*a*, a heating operation of the air-fuel mixture by the glow plug may be performed as the approach process.

In the process of adjusting the combustion region, the target value for reducing the difference of the combustion region to be smaller than the reference distance is set based on the actual mixing ratio. In that case, as in the process of adjusting the combustion amount, a provisional target value is acquired based on the reference mixing ratio, and the provisional target value is corrected with the use of the actual mixing ratio to calculate the target value.

When the difference in the combustion region is smaller than the reference distance, it is determined that the process of adjusting the combustion region is unnecessary, and the process proceeds directly to step S110.

In step S110, the ignition timing of the reference fuel is read from the memory 80b, a "deviation" between the ignition timing of the reference fuel and the ignition timing of the actual fuel is calculated as a difference, and it is determined whether the difference is smaller than a predetermined reference time, or not. The difference in this case is an absolute value of the difference between the ignition timing of the reference fuel and the ignition timing of the actual fuel.

When the difference in ignition timing is not smaller than the reference time, the process proceeds to step S111, and a process of adjusting the ignition timing is performed so that the difference becomes smaller than the reference time. In this case, when the ignition timing of the actual fuel is later than the ignition timing of the reference fuel, an accelerating process for accelerating the ignition timing is performed, and when the ignition timing of the actual fuel is earlier than the ignition timing of the reference fuel, a delaying process for delaying the ignition timing is performed. Examples of the accelerating process include a process of accelerating the injection timing and a process of increasing the number of injection stages, and the delaying process includes a process of delaying the injection timing and a process of decreasing the number of injection stages.

In the process of adjusting the ignition timing, the target value for reducing the difference of the ignition timing to be smaller than the reference time is set based on the actual mixing ratio. In that case, as in the process of adjusting the combustion amount, a provisional target value is acquired based on the reference mixing ratio, and the provisional target value is corrected with the use of the actual mixing ratio to calculate the target value.

If the difference in the ignition timing is smaller than the reference time, it is determined that the process of adjusting the ignition timing is unnecessary, and the post control process is terminated as it is. Steps S107, S109, and S111 correspond to a combustion control unit.

The operational effects of the first embodiment described above will be described.

According to the first embodiment, since the combustion state of the fuel is estimated in the post injection that is relatively likely to cause the ignition delay, the exhaust gas temperature and the exhaust gas component can be properly managed. The present inventors have acquired knowledge that a relationship of the three combustion parameters including the combustion amount, the combustion region, and the ignition timing does not have regularity with respect to the mixing ratio of the molecular structural species contained in the fuel. On the other hand, since the three combustion parameters are estimated separately, even if the molecular structural species contained in the actual fuel are different from each other or, even if the mixing ratio of the molecular structural species is different from each other, the combustion state by the post injection can be properly estimated. In this case, since the estimation precision of the exhaust gas component and the exhaust gas temperature in the exhaust gas of the internal combustion engine 10 is also improved, the exhaust gas post-treatment such as the NOx purification of the NOx purification catalyst 31 and the PM combustion of the DPF 32 can be appropriately performed.

According to the first embodiment, three combustion parameters are estimated with the use of the five injection parameters including the injection amount, the lower heat generation amount, the penetration, the diffusion state, and the ignition delay characteristic. In this case, for example, as compared with the case where the combustion parameter is directly estimated with the use of the function, the map, or the model for the actual mixing ratio, the degree of dependence of the estimation result on the functions, the maps, and the models can be lowered, and the difficulty of creating the functions, the maps and the models can be lowered. For that reason, the estimation precision of the combustion parameter can be improved.

In the first embodiment, the five injection parameters are individually estimated based on the actual mixing ratio. For that reason, even if the degree of influence of the actual mixing ratio is different from each other for each injection parameter, all of the five injection parameters are used in estimating the combustion amount. In addition, the present inventors have acquired knowledge that the five injection parameters have a correlation corresponding to the actual mixing ratio by experiment, simulations, and the like. Even in this case, the estimation precision of the combustion amount can be enhanced by daringly using all of the five injection parameters.

According to the first embodiment, since all of the five injection parameters are used to estimate the combustion amount, the estimation precision of the combustion amount can be improved.

According to the first embodiment, four injection parameters including the injection amount, the penetration, the diffusion state, and the ignition delay characteristic among the five injection parameters are used for the estimation of the combustion region. In addition, in estimating the combustion region, no use of the low heat generation amount, which is less susceptible to the combustion region, means that the influence of the actual mixing ratio on the estimation of the lower heat generation amount is not included in the estimation result of the combustion region. For that reason, the estimation precision can be restricted from being lowered with an increase in the number of injection parameters used for estimation of the combustion region.

According to the first embodiment, three injection parameters including the injection amount, the diffusion state, and the ignition delay characteristic among the five injection parameters are used for the estimation of the ignition timing. In this example, in estimating the ignition timing, no use of the low heat generation amount and the penetration, which are less susceptible to the ignition timing, means that the influence of the actual mixing ratio on the estimation of the lower heat generation amount and the penetration is not included in the estimation result of the combustion region. For that reason, the estimation precision can be restricted from being lowered with an increase in the number of injection parameters used for estimation of the ignition timing.

According to the first embodiment, since the actual mixing ratio is estimated, the amount of the molecular structural species contributing to the production and consumption of the OH radicals can be estimated, and the amount of the produced molecules causing the chain branching reaction and the OH radical distribution can be grasped. The ignition timing depending on the chain branching reaction can be appropriately estimated even if a time, which is required from the occurrence of the chain branching reaction to the ignition, varies depending on the fuel components in the medium temperature range where the post injection is performed. In the medium temperature range, the decomposition reaction of $H2O2$ which promotes the ignition also affects the ignition timing.

According to the first embodiment, the OH radical distribution is estimated based on the in-cylinder temperature and the in-cylinder oxygen concentration in addition to the actual mixing ratio. In this case, since the ignition timing is estimated in consideration of both of the ignition delay depending on the fuel component causing the chain branching reaction and the ignition delay depending on the oxidation reaction by the decomposition reaction of $H2O2$, the estimation precision can be enhanced.

According to the first embodiment, the respective processes for adjusting the combustion amount, the combustion region, and the ignition timing are performed based on the actual mixing ratio, the combustion amount. Therefore, a situation, in which the deviations of the combustion amount, the combustion region, and the ignition timing do not fall within the reference amount, the reference distance, and the reference time, respectively, even though those adjusting processes are performed, can be restricted from occurring. For that reason, with the use of the actual mixing ratio, high estimation precision can be effectively leveraged for controlling the internal combustion engine 10 in a configuration in which the estimation precision of the combustion amount, the combustion region, and the ignition timing is enhanced.

Second Embodiment

In the first embodiment, the post estimation process is performed whereas in a second embodiment, a main injection estimation process is performed in addition to the post estimation process. Now, a post control process according to the present embodiment will be described with reference to a flowchart of FIG. 20.

Figure 20:
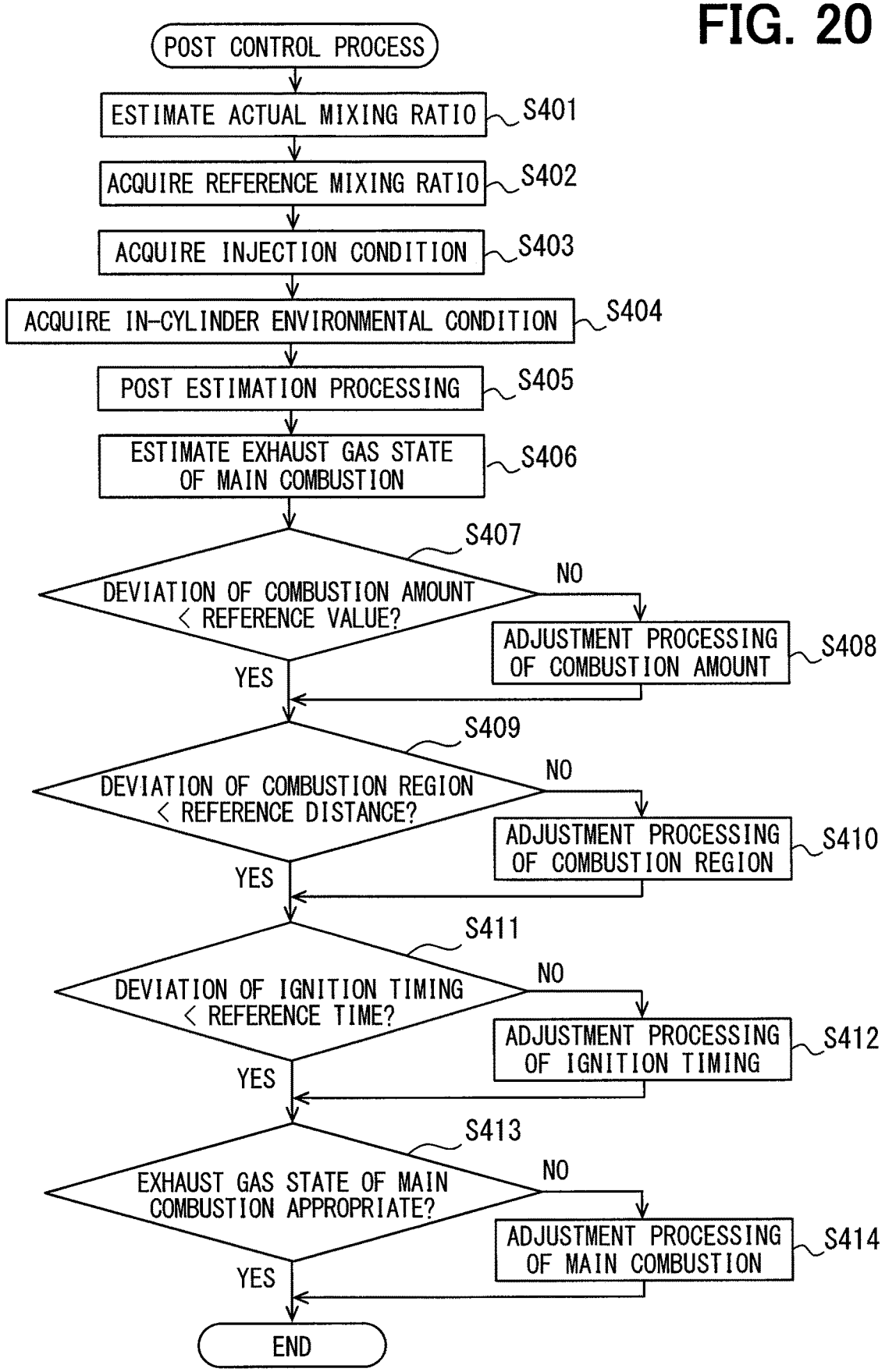
FIG. 20 is a flowchart showing a procedure of post control process according to a second embodiment.

In FIG. 20, in steps S401 to S405, the same processing as steps S101 to S105 according to the first embodiment is performed. In step S406, an exhaust gas state of the main combustion is estimated. The combustion of a fuel by a main injection is called "main combustion." A state in the combustion chamber 11a after the main combustion is brought into an exhaust gas state and is estimated based on an actual mixing ratio and an in-cylinder environment. As the exhaust gas state, the amount of combustion exhaust gas such as unburned HC is taken. Estimation of the amount of the combustion exhaust gas means estimation of the exhaust gas state. The exhaust gas state includes a change mode of the molecular structural species after the main combustion, and estimation of the change mode of a molecular structural species means estimation of the exhaust gas state.

In steps S407 to S412, the same processing as that in steps S106 to S111 according to the first embodiment is performed. In step S413, it is determined whether the exhaust gas state of the main combustion is appropriate, or not. As a reference fuel, the exhaust gas state of the main combustion such as the amount of the combustion exhaust gas is acquired in advance by experiment or the like, and acquired data is stored in the memory 80b. In this example, the amount of the combustion exhaust gas of the reference fuel is read from the memory 80b, a "deviation" between this amount of combustion exhaust gas and the amount of combustion exhaust gas of the actual fuel is calculated as a difference, and it is determined whether the difference is smaller than a predetermined reference amount, or not. The difference in this case is an absolute value of the difference between the amount of combustion exhaust gas of the reference fuel and the amount of combustion exhaust gas of the actual fuel. If the difference is not smaller than the reference amount, it is determined that the exhaust gas state of the main combustion is not appropriate, and the process proceeds to step S414.

In step S414, a process of adjusting a main combustion is performed. In this example, when the amount of the combustion exhaust gas of the actual fuel is larger than the amount of the combustion exhaust gas of the reference fuel, a reduction process for reducing the amount of the combustion exhaust gas by the post injection is performed. Further, when the amount of the combustion exhaust gas of the actual fuel is smaller than the amount of the combustion exhaust gas of the reference fuel, a holding process for holding the amount of the combustion exhaust gas by the post injection is performed. Examples of the reduction process include a process of increasing an injection pressure, a process of shifting an injection timing toward a TDC side of a piston 13, and examples of the holding process include a process of decreasing the injection pressure and a process of increasing the injection timing to a BDC side of the piston 13 and the like. Steps S408, S410, S412, and S414 correspond to a combustion control unit.

According to the second embodiment, with the use of the actual mixing ratio when estimating the exhaust gas state of the main combustion, the estimation precision can be enhanced. In this case, since each estimation precision of the main combustion and the post combustion is enhanced with the actual mixing ratio, the temperature and components of the exhaust gas discharged to the exhaust pipe 16ex according to the post injection can be appropriately managed.

Other Embodiments

The disclosure is not at all limited to the preferred embodiments of the disclosure described above and can be implemented in various modified forms as exemplified below. Not only combination between the elements explicitly specified in each of the embodiments to be capable of being combined with each other but also partial combination between the embodiments can be conducted even without explicit expression insofar as the combination is not particularly hindered.

As a modification 1, the mixing ratio estimation unit 82 may not estimate the mixing ratio of the molecular structural species based on the multiple combustion characteristic values, but may detect the general property of the fuel with a sensor, and estimate the mixing ratio based on the detection result. Specific examples of the above general properties include a fuel density, a kinematic viscosity, a distillation temperature, and the like.

Further, the mixing ratio may be estimated based on both of the estimation result with the mixing ratio estimation unit 82 and the detection result of the sensor. For example, the mixing ratio estimated based on one of the estimation result and the detection result may be corrected based on the other. In addition, the mixing ratio may be estimated with different methods depending on the molecular structural species. For example, the mixing ratio of the first molecular structural species is estimated based on the estimation result of the mixing ratio estimation unit 82, and the mixing ratio of the second molecular structural species is estimated based on the detection result of the sensor.

As a modification 2, instead of estimating the mixing ratio of the molecular structural species contained in the fuel, a mixing ratio of components such as hydrogen, carbon, sulfur, nitrogen, and oxygen contained in the fuel may be estimated. For example, an average number of carbon atoms, an average number of hydrogen atoms, an HC ratio which is the ratio of the number of hydrogen atoms to the number of carbon atoms, and the like can be taken as the mixing ratio for hydrogen and carbon. In the present configuration, injection parameters such as the injection amount and combustion parameters such as the combustion amount are estimated based on the mixing ratio of various components. In this case, even if the components contained in the actual fuel are different or even if the mixing ratio of the components is different, the combustion state caused by the post injection can be properly estimated. The fuel component such as the average number of carbon atoms can also be referred to as an intermediate parameter.

As a modification 3, the adjusting process in step S107 and the like according to the first embodiment and the adjusting process in step 408 and the like according to the second embodiment are not performed based on the actual mixing ratio, but may be performed regardless of the actual mixing ratio. For example, in the first embodiment, after the combustion amount is estimated based on the actual mixing ratio in step S206, in step S107, the target injection amount or the like is set regardless of the actual mixing ratio in order to adjust the combustion amount.

As a modification 4, the control process of the combustion system may not be performed on the basis of the mixing ratio of the molecular structural species contained in the fuel, but may be performed regardless of the mixing ratio of the molecular structural species. Even in that case, the estimation result of the post combustion using the mixing ratio of the molecular structural species can be reflected in the control process of the combustion system.

As a modification 5, the combustion parameter such as the combustion amount may be estimated with the use of at least one of the five injection parameters such as the injection amount. For example, the combustion amount is estimated with the use of only the injection amount. Even in that case, a certain level of estimation precision in estimating the combustion amount can be ensured due to the issue that the five injection parameters are correlated with each other.

As a modification 6, the OH radical distribution may not be used when the ignition timing is estimated. Even in that case, the ignition timing is estimated with the use of at least one of the five injection parameters, thereby being capable of ensuring a certain level of estimation precision.

As a modification 7, when the OH radical distribution is estimated, one of the in-cylinder temperature and the in-cylinder oxygen concentration may be used rather than the use of both of the in-cylinder temperature and the in-cylinder oxygen concentration. In addition, the amount of H2O2 in the combustion chamber 11a may be used. In any case, when the OH radical distribution is estimated, at least the actual mixing ratio may be used.

As a modification 8, in the post combustion, the lower heat generation amount may not be used as the injection parameter, but the higher heat generation amount may be used as the injection parameter. In addition, the heat generation amount including both of the lower heat generation amount and the higher heat generation amount may be used as the injection parameter.

As a modification 9, the injection parameters such as the injection amount and the combustion parameters such as the combustion amount may not be estimated, individually, for each of the actual mixing ratio and the reference mixing ratio. For example, a difference between the actual mixing ratio and the reference mixing ratio is calculated, and a difference between the injection parameter and the combustion parameter is estimated based on the calculated difference. In that case, the "deviation" between the combustion state of the reference fuel and the combustion state of the actual fuel is directly estimated.

As a modification 10, the combustion parameter such as the combustion amount may be estimated without any use of the injection parameter such as the injection amount. For example, the combustion amount is not estimated based on the injection parameter, but is estimated based on the detection signal of the in-cylinder pressure sensor 21 and the actual mixing ratio. Even in that case, the actual mixing ratio of the fuel can be reflected in the estimation of the combustion amount.

As a modification 11, a property sensor for detecting general properties of the fuel may be provided. For example, a fuel tank or a common rail is provided with the property sensor for detecting a kinematic viscosity and a density of the fuel. In this configuration, the average number of carbon atoms and the average number of hydrogen atoms of the fuel may be estimated based on the detection result of the property sensor. Further, the heat generation amount such as the lower heat generation amount of the fuel may be estimated based on the detection result of the property sensor.

As a modification 12, the in-cylinder temperature may be estimated based on the in-cylinder pressure detected with the in-cylinder pressure sensor 21, instead of being detected with the temperature detection element 21a. More specifically, the in-cylinder temperature is calculated according to the in-cylinder pressure, the cylinder capacity, a gas weight in the cylinder, and a gas constant for estimation.

As a modification 13, the unit and/or the function produced with the ECU 80 as the estimation device and the control device of the combustion system can be produced with software stored in a substantive storage medium and a computer executing the software, with software alone, with hardware alone, or with a combination of the software and the hardware. In a case where the combustion system control device is produced with a hardware circuit, for example, it can be produced with an analog circuit or a digital circuit including multiple logic circuits.

The estimation device 80 according to the first disclosure described above is applied to the combustion system having the internal combustion engine 10. The estimation device 80 includes a mixing acquisition unit S101, a combustion amount estimation unit S206, a region estimation unit S207, and a timing estimation unit S208. The mixing acquisition unit S101 acquires a mixing ratio of various components contained in a fuel used for combustion in the internal combustion engine. The combustion amount estimation unit S206 estimates a combustion amount of the fuel caused by a post combustion produced by injecting the fuel into a combustion chamber 11a of the internal combustion engine with post injection, based on the mixing ratio acquired by the mixing acquisition unit. The region estimation unit S207 estimates a combustion region of the post combustion in the combustion chamber based on the mixing ratio. The timing estimation unit S208 estimates an ignition timing at which ignition occurs in the combustion chamber by the post injection based on the mixing ratio.

According to the first disclosure, the exhaust gas temperature and the exhaust gas component can be grasped by estimating the combustion amount, the combustion region, and the ignition timing for the post combustion generated by the post injection. For example, when the combustion amount is small, or when the combustion region is far from a fuel injection source and the ignition timing is delayed, the exhaust gas temperature is less likely to rise, and the amount of PM as the exhaust gas component is likely to increase. For that reason, the combustion amount, the combustion region, and the ignition timing are appropriately managed, thereby being capable of obtaining a desired exhaust gas temperature and exhaust gas component.

Moreover, all of the combustion amount, the combustion region, and the ignition timing are estimated based on the mixing ratio of various components contained in the fuel. For that reason, even if the components contained in the fuel are different from each other or the mixing ratio of the components is different from each other, the combustion amount, the combustion region, and the ignition timing can be appropriately managed, respectively. Therefore, even when any fuel having various properties is used, post-treatment of the exhaust gas using the NOx purification catalyst, DPF, or the like can be properly performed.

The control device 80 according to the second disclosure described above is applied to the combustion system having the internal combustion engine 10. The control device 80 includes a mixing acquisition unit S101, a combustion amount estimation unit S206, a region estimation unit S207, a timing estimation unit S208, and combustion control units S107, S109, S111, S408, S410, S412, and S414. The mixing acquisition unit S101 acquires a mixing ratio of various components contained in a fuel used for combustion in the internal combustion engine. The combustion amount estimation unit S206 estimates a combustion amount of the fuel caused by a post combustion produced by injecting the fuel into a combustion chamber 11a of the internal combustion engine with post injection, based on the mixing ratio acquired by the mixing acquisition unit. The region estimation unit S207 estimates the combustion region of the post combustion in the combustion chamber based on the mixing ratio. The timing estimation unit S208 estimates an ignition timing at which ignition occurs in the combustion chamber by the post injection based on the mixing ratio. The combustion control units S107, S109, S111, S408, S410, S412, and S414 control the combustion system based on the respective estimation results of the combustion amount estimation unit, the region estimation unit, and the timing estimation unit.

According to the second disclosure, the same advantages as those in the first disclosure can be obtained.

The present disclosure has been described with reference to the examples, but the present disclosure is not limited to the examples or the structures. The present disclosure includes various modification examples and modifications within the same range. In addition, it should be understood that various combinations or aspects, or other combinations or aspects, in which only one element, one or more elements, or one or less elements is included to the various combinations or aspects, are included in the scope or the technical idea of the present disclosure.

The invention claimed is:

1. An estimation device applicable to a combustion system having an internal combustion engine, comprising:
    a mixing acquisition unit to acquire a mixing ratio of various components contained in a fuel used for combustion in the internal combustion engine;
    a combustion amount estimation unit to estimate a combustion amount of the fuel caused by a post-combustion generated by injecting the fuel into a combustion chamber of the internal combustion engine by post injection, based on the mixing ratio acquired by the mixing acquisition unit;
    a region estimation unit to estimate a combustion region of the post combustion in the combustion chamber based on the mixing ratio; and
    a timing estimation unit to estimate an ignition timing, at which ignition occurs in the combustion chamber with the post injection, based on the mixing ratio.

2. The estimation device for the combustion system according to claim 1, further comprising at least one of:
    an injection amount estimation unit to estimate the injection amount by the post injection based on the mixing ratio;
    a heat generation amount estimation unit to estimate the amount of heat generation of fuel in the post combustion based on the mixing ratio;
    a penetration force estimation unit to estimate a penetration force of fuel by the post injection based on the mixing ratio;
    a diffusion estimation unit to estimate a diffusion state of fuel by the post injection based on the mixing ratio; and
    an ignition delay estimation unit to estimate an ignition delay characteristic as ease of ignition of fuel based on the mixing ratio, wherein
    the combustion amount estimation unit, the region estimation unit, and the timing estimation unit are to estimate the combustion amount, the combustion region, and the ignition timing, based on at least one of the injection amount, the heat generation amount, the penetration force, the diffusion state, and the ignition delay characteristic.

3. The estimation device for the combustion system according to claim 2, wherein
    the combustion amount estimation unit is to estimate the combustion amount based on the injection amount, the heat generation amount, the penetration force, the diffusion state, and the ignition delay characteristic.

4. The estimation device for the combustion system according to claim 2, wherein
    the region estimation unit is to estimate the combustion region based on the injection amount, the penetration force, the diffusion state, and the ignition delay characteristic among the injection amount, the heat generation amount, the penetration force, the diffusion state, and the ignition delay characteristic.

5. The estimation device for the combustion system according to claim 2, wherein
    the timing estimation unit is to estimate the ignition timing based on the injection amount, the diffusion state, and the ignition delay characteristic among the injection amount, the heat generation amount, the penetration force, the diffusion state, and the ignition delay characteristic.

6. The estimation device for the combustion system according to claim 2, further comprising:
    an OH radical estimation unit to estimate an OH radical generation state as an OH radical distribution based on the mixing ratio, in a case where an internal temperature of the combustion chamber is in a temperature range where the post injection is performed, wherein
    the timing estimation unit is to estimate the ignition timing based on the OH radical distribution estimated with the OH radical estimation unit in addition to at least one of the injection amount, the heat generation amount, the penetration force, the diffusion state, and the ignition delay characteristic.

7. The estimation device for the combustion system according to claim 6, further comprising:
- a temperature acquisition unit to acquire an internal temperature of the combustion chamber; and
- an oxygen acquisition unit to acquire an oxygen concentration in the combustion chamber, wherein
- the OH radical estimation unit is to estimate the OH radical distribution based on the internal temperature acquired with the temperature acquisition unit and the oxygen concentration acquired with the oxygen acquisition unit, in addition to the mixing ratio.

8. A control device applicable to a combustion system having an internal combustion engine, comprising:
- a mixing acquisition unit to acquire a mixing ratio of various components contained in fuel used for combustion in the internal combustion engine;
- a combustion amount estimation unit to estimate a combustion amount of the fuel caused by a post-combustion generated by injecting the fuel into a combustion chamber of the internal combustion engine by post injection, based on the mixing ratio acquired by the mixing acquisition unit;
- a region estimation unit to estimate a combustion region of the post combustion in the combustion chamber based on the mixing ratio;
- a timing estimation unit to estimate an ignition timing, at which ignition occurs in the combustion chamber by the post injection, based on the mixing ratio; and
- a combustion control unit to control the combustion system based on respective estimation results of the combustion amount estimation unit, the region estimation unit, and the timing estimation unit.

9. The control device for the combustion system according to claim 8, wherein the combustion control unit controls the combustion system based on the mixing ratio in addition to the respective estimation results of the combustion amount estimation unit, the region estimation unit, and the timing estimation unit.

* * * * *